United States Patent
Natunen et al.

(10) Patent No.: US 8,010,413 B2
(45) Date of Patent: Aug. 30, 2011

(54) METHOD, SYSTEM, AND MEDIUM FOR CALCULATING AN EMISSIONS ALLOWANCE

(75) Inventors: Jari Natunen, Vantaa (FI); Juha Natunen, Helsinki (FI)

(73) Assignee: Jari Natunen (FI)

( * ) Notice: Subject to any disclaimer, the term of this patent is extended or adjusted under 35 U.S.C. 154(b) by 438 days.

(21) Appl. No.: 12/294,125

(22) PCT Filed: Mar. 23, 2007

(86) PCT No.: PCT/FI2007/050161
§ 371 (c)(1),
(2), (4) Date: Sep. 23, 2008

(87) PCT Pub. No.: WO2007/107641
PCT Pub. Date: Sep. 27, 2007

(65) Prior Publication Data
US 2009/0132386 A1 May 21, 2009

(30) Foreign Application Priority Data
Mar. 23, 2006 (WO) .................. PCT/FI2006/050112
Sep. 28, 2006 (FI) ...................................... 20060864

(51) Int. Cl.
G06Q 30/00 (2006.01)
(52) U.S. Cl. .................................................. 705/26.1
(58) Field of Classification Search .................. 705/7.35, 705/19, 26.1, 37, 35, 36 T, 30
See application file for complete search history.

(56) References Cited

U.S. PATENT DOCUMENTS

| | | | |
|---|---|---|---|
| 5,412,564 A | 5/1995 | Ecer | |
| 5,819,735 A | 10/1998 | Mansfield et al. | |
| 5,852,560 A * | 12/1998 | Takeyama et al. | 700/97 |
| 5,878,433 A | 3/1999 | Miyamoto | |
| 6,283,914 B1 * | 9/2001 | Mansfield et al. | 600/300 |
| 6,387,049 B1 | 5/2002 | Moore | |
| 6,688,525 B1 | 2/2004 | Nelson et al. | |
| 7,219,042 B2 * | 5/2007 | Kobayashi et al. | 703/6 |
| 7,343,341 B2 * | 3/2008 | Sandor et al. | 705/37 |
| 7,529,705 B1 * | 5/2009 | Bartels et al. | 705/37 |
| 2002/0062594 A1 * | 5/2002 | Erickson | 47/48.5 |
| 2002/0102966 A1 | 8/2002 | Lev et al. | |
| 2002/0116209 A1 | 8/2002 | Tsuge | |
| 2002/0143693 A1 * | 10/2002 | Soestbergen et al. | 705/37 |

(Continued)

FOREIGN PATENT DOCUMENTS
EP 0964349 A2 12/1999
(Continued)

OTHER PUBLICATIONS

Global Warming: Economic Policy Responses, edited by Rudiger Dornbusch and James M. Poterba, pp. 71-98. Cambridge, MA: MIT Press, 1991.*

*Primary Examiner* — Yogesh C Garg
*Assistant Examiner* — Matthew Zimmerman
(74) *Attorney, Agent, or Firm* — Brooks Kushman P.C.

(57) ABSTRACT

The invention describes a novel integrated data-system, a personal device for the system, and methods for operating the system. The invention produces means and technology for providing quantitative information about products. A key function of the system is to provide information about product-based emissions, such as carbon dioxide emissions.

28 Claims, 3 Drawing Sheets

U.S. PATENT DOCUMENTS

| | | |
|---|---|---|
| 2003/0218069 A1 | 11/2003 | Meier et al. |
| 2004/0015454 A1* | 1/2004 | Raines et al. ............... 705/412 |
| 2004/0039684 A1* | 2/2004 | Sandor ............................ 705/37 |
| 2004/0049424 A1* | 3/2004 | Murray et al. ................. 705/14 |
| 2004/0100383 A1 | 5/2004 | Chen et al. |
| 2004/0230443 A1* | 11/2004 | McMorris et al. ................ 705/1 |
| 2004/0249732 A1* | 12/2004 | Drummond ..................... 705/30 |
| 2004/0254743 A1 | 12/2004 | Sakurai et al. |
| 2005/0246190 A1* | 11/2005 | Sandor et al. ..................... 705/1 |
| 2006/0089851 A1* | 4/2006 | Silby et al. ........................ 705/1 |
| 2006/0095356 A1* | 5/2006 | Koornstra ....................... 705/35 |

FOREIGN PATENT DOCUMENTS

| | | |
|---|---|---|
| EP | 1298555 A1 | 4/2003 |
| EP | 1355247 A1 | 10/2003 |
| EP | 1630732 A1 * | 3/2006 |
| JP | 2003228616 A | 8/2003 |
| WO | 0058851 A1 | 10/2000 |
| WO | 0250727 A1 | 6/2002 |
| WO | 2004107227 A1 | 12/2004 |
| WO | 2005124657 A1 | 12/2005 |
| WO | WO 2007079228 A2 * | 7/2007 |

* cited by examiner

METHOD, SYSTEM, AND MEDIUM FOR CALCULATING AN EMISSIONS ALLOWANCE

FIELD OF THE INVENTION

The invention describes a novel integrated data-system, a personal device for the system, and methods for operating the system. The invention produces means and technology for providing quantitative information about products. A key function of the system is to provide information about product-based emissions, such as carbon dioxide emissions.

BACKGROUND OF THE INVENTION

Greenhouse Effect as a Major Technical Environmental Problem

Greenhouse effect (GHE) is the major global threat to the future of mankind. Warming climate causes e.g. changing weather conditions including increasing number of the strongest storms such as hurricanes, drought, floods and rising sea level. The severity of problems caused by the greenhouse effect may vary time to time depending on location, but local conditions, such as hurricane Katrina in autumn 2005 bringing the sea to New Orleans, have major impact on the global economy and welfare of all people.

GHE is technical problem caused by increase of greenhouse gasses in the atmosphere. Key greenhouse gasses (GHG) include e.g. carbon dioxide, $CO_2$, and methane. It is known, that stopping the increase of these gasses in the atmosphere would prevent the problem from escalating. However, so far the measures for preventing the greenhouse effect have not been successful, as not all countries have taken measures against it. Newly industrializing countries may consider that their industries cannot carry the costs of reducing the emission and the increasing cost of production of goods for rich western economies. On the other hand the consumers using the goods should carry the cost of the specific consumption and may be more able to do that than the industries under hard competition. Currently the European efforts in reducing the GHG-emissions on industry level has partially lead to movement of industries to developing countries outside of Kyoto-protocol regions and even increase of emissions due to e.g. increased transport.

Currently there is no system that would give 1) exact and comparable information about the product level GHG-emission of numerous products to consumer and 2) display it in an easily understandable form and 3) allow effective personal level trading of green house gas emissions. Without these means the individual persons would not be able to control their share of the problem, and would not be able to effectively support sustainable production. The frustrated consumers may close their eyes for the difficult problem, or radically stop consumption of also products, which have not real effect on GHE or even developed including low or no emission, leading to non-effective reduction of GHG, economic recession and even decrease ability cope with the problem.

It is further realized that many people would be interested in getting useful information about product associated emission, especially GHG-emission beside possibly managing and controlling personal GHG-emissions. Families and house holds would also be interested in learning and educating each other about their consumption and possible voluntary system a) for allocation of the emission burden between family members and interfamily/household exchange of excess Daily Allowance units (novel demonstrative unit for acceptable emission levels) or b) for combined management of the GHG-emission of whole group. The PECD-device and PED-database provide useful new information devices giving new views on everyday products and services.

Novel Integrated Personal Emission Control System (IPECS)

The present invention represents a technical solution of the problem of emission, preferably GHE and similar problem related to indirect effects of products. The Integrated Personal Emission Control System (IPECS) includes devices and methods for 1) allocating the costs of GHE to individual products and 2) delivering information of the costs allowing the consumers to select products with low emissions and compensate emission caused by their consumption. The system supports the producers of low emission products allowing sustainable product development. The invention uses computer technology, internet and personal smaller "calculator" devices such as mobile stations or devices. These would allow a consumer control use of his or her personal emission portion, which is an acceptable daily level of greenhouse gasses caused by personal consumption. The system further includes possibility for trade of GHG-emissions between IPECS and with global GHG-emission trade systems.

A technological analogy of the present system is ABS-brake system in which computer system is used for delivering information about tire conditions to allow effective braking without loosing control of steering. The present invention uses computer technology for accurate delivery of information to consumers about GHG-emissions of numerous individual products. The system would allow and guide consumers to cost effectively and wisely "brake" his or her product associated emissions, without causing additional economic problems or even worsening the problem. The system would further have an educational function and deliver information to producers.

It is realized that the system can be used for control of various environmental or other "indirect properties" associated with various products. Beside GHG-emissions also other pollution and/or emissions can be analyzed per product and compared with an allowable level and communicated to consumers according to the invention with a possible compensation mechanism if possible to be arranged. The invention is specifically directed to control of "indirect properties", which indicates properties of a product, which is not easily observable from the product and which do not essentially affect the direct usefulness of the product, such as emission of gas or other chemical causing negative effect on environment and/or people. The invention is further directed to control of properties related to "multi-individual effects" including "regional multi-individual effects" or "global multi-individual effects" problems, such as pollution effects associated with products, most preferably "global multi-individual effects" such as GHE.

It is further realized that the system according to the invention could be used for simultaneous control of multiple environmental and other problems when these are summed using weight factors of each component problems, so that weight factors indicate the comparative effect of each problem to the individual and the sum value is preferably normalized to recommendable maximal dose of combined problems. The present invention is especially directed to control of the greenhouse effect when the individual greenhouse gasses associated with a product are summed using a weight factor indicating the effect of each individual gas on the increase of GHE.

Certain mobile and/or computer systems have been developed for communication of nutrition related or other direct usefulness information about various food products. The unusual nature of the product information of the present invention sets novel requirement for an effective system handling such information. In contrast to previous systems the present invention is effective for example in handling product information with the following characteristics:

1) Indirect properties of products. Due to indirect nature of the information, for example ethical or emission data, which are usually not directly observable from the product, the communication to consumers should be demonstrative and easy to understand in context of a product. This is especially supported by simple demonstrative presentation formats as e.g. Daily Allowance and Quantitative Product Marks, and/or
2) Multi-individual effects such as emissions associated with the products. The present invention allows e.g. compensation of the negative effect in Personal Emission Trading Interface (PETI) communication between PECD-devices and pooling emissions between family members, and/or
3) The effects which have cumulative effects such as pollution, especially GHE, this solved e.g. by establishing longer term Emission Balance, possibility to compare products and endorse effective products and PETI and/or
4) Effects having an impact on numerous product types, preferably all product types, practically even all products, this is solved e.g. a) by standardization of the problem as part of an Aim Level such as Daily Allowance and by a b) Product emission database (PED), which allows effective production of data also on average levels allowing comparison between different product types and groups. It is clear that exact data from all possible products is very difficult to obtain, as there is by far over then thousand common food products in major shops in Finland, for example, but the system works effectively even with more rough average type information, Individual Product Group Information (IPGI). The IGPI would allow setting up the system and refining it later.

An example of the information with such properties is emissions of GHGs, which would not be observable directly from the product (and usual product information does not include anything about this), it effects cumulatively all people and it is associated with practically all possible products in contrast to other product qualities.

It is also clear for example that nutritional factors affect mainly the consumer of the product (and only in case of food) and do not have major multi-individual effects at least on regional and/or global level. The rationale of spreading of nutritional or other traditional product quality indicators is to describe the product and its direct usefulness to customer, while the present invention adds new dimensions to the product information.

The invention is further directed to effective communication of the GHE-problem (and like) on product level in a form, which is normalized to sustainable level of consumption, and represented in form, which allows comparison of numerous different products.

The present invention is directed to methods for delivering effectively quantitative information related to indirect beneficial or effects related to products offered for customers or consumers.

The term product or goods here is in separate embodiments directed to material products, and/or service products including providing or using material products and/or pure service products. Shop refers to any physical or virtual place from which a customer may buy or order any product.

Product Mark Background

Numerous environmental marks are known and used for labelling products with potential environmental benefit. These marks are used for labelling only the best products fulfilling certain standards and they are not effective in demonstrating negative effects of products, which are not fulfilling the standard. Trademark Climate cool is a good example of this development. The quantitative product mark allows showing the quantitative positive or negative effect of a product. This would allow customers to compare products even when immediate complete improvement of the product is not possible or would be difficult. The mark would allow benefit for responsible producers even when the indirect property is not completely improved.

On the other hand negative product marking is used with harmful products with direct negative health effects to the customer, an example of this is disease information, comprising labelling of cigarettes in the European union. Another example is labelling of food products with health recommendations, for example about how much to use of daily. These marks do not include simple quantitative symbols according to the invention. These marks are directed to direct health properties of the material consumed and thus are related with much simpler problem in communicating the problem to the customer.

Related to the second major embodiment, certain international-standards at least include information of working conditions of employees. Such marking does not demonstrate the indirect benefit or disadvantage for the customer nor present a quantitative effect allowing gradual development of the products. Furthermore the quantitative labour mark according to the present invention would preferably contain information about salary levels of the worker producing the product.

Multiple computer systems have been described for evaluation of effects of greenhouse gases in industrial systems. These do not solve the problem of controlling greenhouse effect, merely providing product data for it. The present invention produces novel solutions for providing and using data, preferably quantitative product based data and offers means for compensating emissions.

In EP 0964349 a method for determining the total environmental load for the entire lifetime of a product is described. This load is based on other criteria than emissions of green house effect causing gasses.

U.S. Pat. No. 5,878,433 describes a method for performing an environmental load assessment for a product for making it possible to compare products with each other. Still it does not offer the possibility of calculating a personal effect on the green house gas emissions.

In EP 1298555 a method for calculating an environment information evaluation result for a product based on the parts of the product is presented.

JP 2003228616 describes a method according to which results of an evaluation of a product are presented as a product evaluation map or evaluation score but does not offer means for determining the impact on the green house effect on a personal level.

US 2004/0254743 provides an industrial life cycle assessment system providing information about numerous variables. The system is not useable on a personal level.

EP 1355247 presents a method wherein the total environmental load for a product is calculated.

WO 02/50727 is directed to a system for transactions via a mobile network with predefined limits for transactions.

US 2004/0100383 presents a method for using a bar code or RFID for obtaining information from a product.

DESCRIPTION OF THE INVENTION

Figure 1:
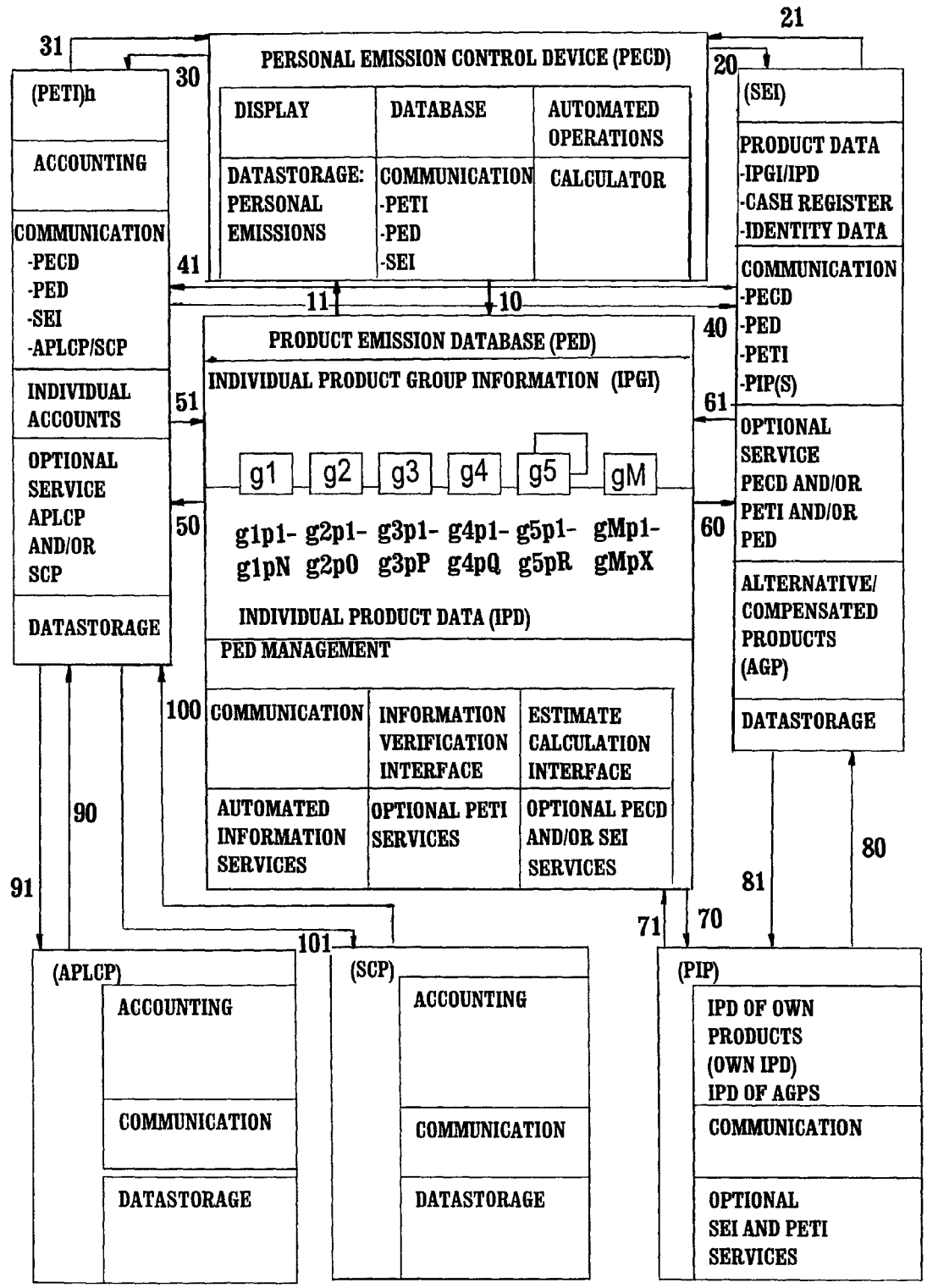
FIG. 1. shows the key components of the IPECS system. The key communication processes between the units are marked by numbers.
Figure 2:
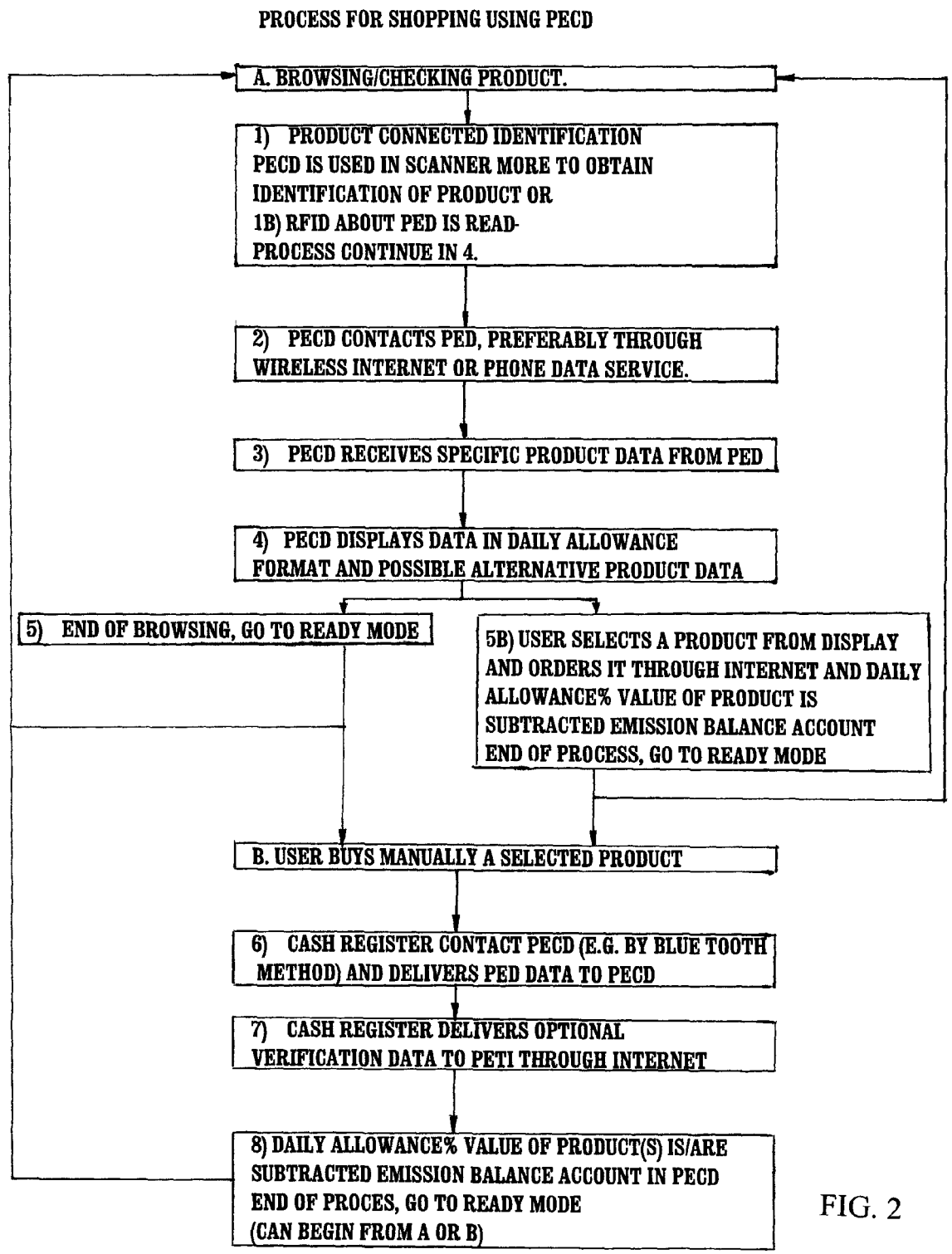
FIG. 2. shows an example of buying process by PECD.
Figure 3:
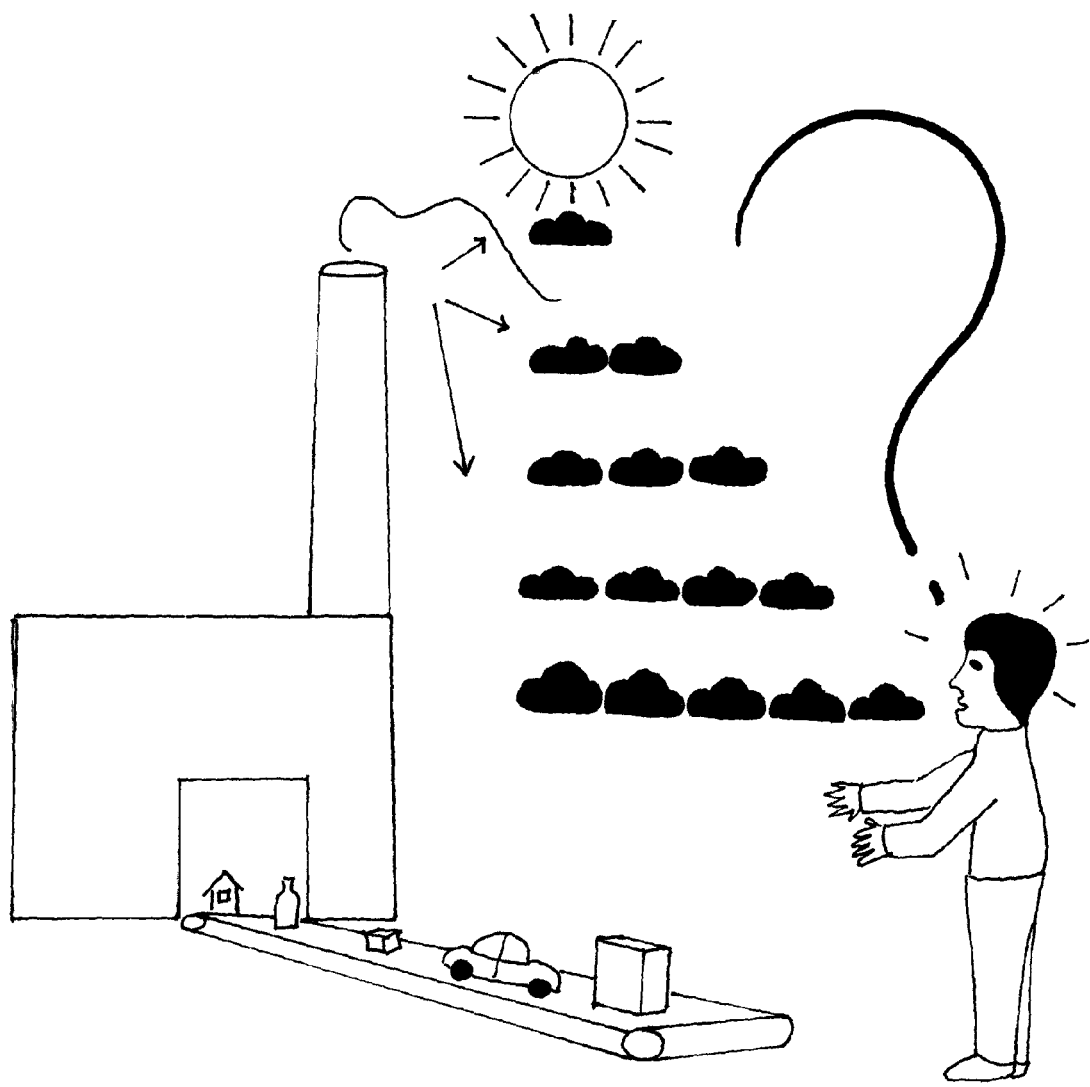
FIG. 3. shows an example of a Cloud environment mark concept.

The invention is directed to multi-component system called IPECS, which can be integrated with and include special Quantitative Product Marks (QPM). Key structures of IPECS, especially Personal Emission Control Device (PECD), may be also used separately. The system provides effectively quantitative information about product based indirect properties, especially environmental factors such as green house gas emissions.

The invention is also directed to a system for obtaining information about indirect property of a product comprising a personal PECD-device containing an account for cumulative balance for the information about the indirect property; a PED database in a PECD-device and/or means for contacting an external PED, the PED database containing information about the indirect property normalized per product unit, means for calculating cumulative balance values about the indirect property and an optional external PED-database. The system preferably further comprises connections to one, two or three of systems selected from the group of a shop emission interface SEI, for obtaining electronic information about a product identity or PED data, and/or a personal emission trade interface (PETI) for compensation of the indirect effect and connections to other PECD devices, preferably in the same household. The system is preferably programmed to perform automated or semi automated shopping based on preset criteria about indirect property and optionally other criteria such as price of the product.

The invention is also directed to a PECD device, wherein the device comprises optionally one or several of the following connections; to a shop emission interface and/or to a personal emission trade interface (PETI), and/or to a PED database and/or a connection for product connected data, preferably a bar code scanning or RFID reading device and/or a connection to other PECD devices, preferably in the same household.

One aspect of the invention is a system for obtaining information about indirect property of a product comprising a personal PECD-device containing, an account for cumulative balance for the information about the indirect property; a PED database in PECD-device and/or means for contacting an external PED, the PED database containing information about the indirect property normalized per product unit; means for calculating cumulative balance values about the indirect property and an optional external PED-database. The system can further comprise connections to one, two or three of systems selected from the group of a shop emission interface SEI, for obtaining electronic information about a product identity or PED data, and/or a personal emission trade interface (PETI) for compensation of the indirect effect and other PECD devices, preferably in the same household.

Further the invention is directed to a system for controlling greenhouse effect by transferring information about product associated green house gas emissions of a product comprising a personal PECD-device, which is a personal mobile station or Internet portal comprising an account for cumulative balance for the emission information about the product based green house gas emission data; a PED database in PECD-device and/or means for contacting an external PED, the PED database containing information about the green house gas emissions normalized per product unit; means for calculating cumulative balance values about the indirect property and an optional external PED-database. The green house gas emission data is i) the amount of green house phenomenon causing gasses is presented as equivalents of carbon dioxide and ii) the data is represented on a display as part or proportion of a daily allowance, wherein the daily allowance is calculated as a relation of emission produced for a single product in relation to a globally sustainable emission level per person per day calculated as a relative value, preferably as per cent. The system further comprises connections to one, two or three of systems selected from the group of a shop emission interface SEI, for obtaining electronic information about a product identity or PED data, and/or a personal emission trade interface (PETI) for compensation of the product associated greenhouse gas emissions other PECD devices, preferably in the same household.

A further aspect of the invention is a system for controlling greenhouse effect by transferring information about product associated green house gas emissions of a product comprising a personal PECD-device, which is a personal mobile station or internet portal comprising an account for cumulative balance for the emission information about the product based green house gas emission data; a PED database in PECD-device and/or means for contacting an external PED, the PED database containing information about the green house gas emissions normalized per product unit; means for calculating cumulative balance values about the indirect property and an optional external PED-database and wherein the green house gas emission data is a) the amount of green house phenomenon causing gasses is presented as equivalents of carbon dioxide and b) the data is represented on a display as part or proportion of a daily allowance, wherein the daily allowance is the amount of emission per person which does not lead to increase of greenhouse effect. The system may further comprise connections to one, two or three of systems selected from the group of a shop emission interface SEI, for obtaining electronic information about a product identity or PED data, and/or a personal emission trade interface (PETI) for compensation of the product associated greenhouse gas emissions and other PECD devices, preferably in the same household. The system may also include a shop emission interface, and the system obtains product identity information and/or product associated emission information from SEI. Also a PETI system can be included.

According to this embodiment the SEI system provides greenhouse gas emission information about the product bought in context of buying and optionally wherein the PECD obtains comparative emission data from alternative products from SEI. The system may further involve compensation of product associated emissions in PETI system, wherein the carbon dioxide units are sold by PETI system to consumers using the PECD system for compensation of Daily allowance or Cumulated Balance needs, or wherein the system is programmed to communicate with other PECD devices and it is used for emission trading and/or allocation between emission balances of persons in the same family or household.

Integrated Personal Emission Control System (IPECS)

The present invention is in a preferred embodiment directed to Integrated Personal Emission Control System (IPECS). The IPECS includes beside the "Core Inventions" of Personal Emission Control Device (PECD) and Product Emission Database (PED) further preferred interfaces to parties in "Emission Trading", which indicates organizations trading with greenhouse gas emission rights such as the World Bank, "Production", which means production of goods and "Markets" meaning shops/market places selling goods (services and/or products). In a preferred embodiment the IPECS includes the Core Inventions and at least one interface to Emission Trading (APLCP and/or SCP), Markets (SEI, QMP) and Production (PIP, QMP). In a more preferred embodiment the interface is to Markets or to Emission Trading and even more preferably both of these, and even more preferably the IPECS includes interfaces to both of them and most preferably the IPECS includes all three interfaces to Emission Trading, Markets and Production.

Personal Emission Control Device (PECD)

Personal Emission Control Device (PECD) is a computer device or a group of computer devices, which includes at least means for following operations 1) Contacting PED and obtaining individual product information from the Product Emission Database (PED), and at least one of following operations 2) or 3)
2) a) Optionally calculating the data as part of Aim Level
   b) Display of data as a representation of PED data as part of an "Aim Level" such as "Daily Allowance Level",
3) Calculating "Emission Balance" based PED-data obtained about the goods (products and/or services) bought and/or consumed More preferably PECD includes at least means for the following operations 1) Contacting a PED and obtaining individual product information from the Product Emission Database (PED),
2) Display of data as a representation of PED data as a portion of an "Aim Level" such as the "Daily Allowance Level", and Optional display of comparative product data including PED data as a portion of the Aim Level,
3) Optional interactions with Shop Data Interface (SDI), preferably a Shop Emission Interface (SEI) selected from the group of
   a) Optional display of comparative product data including PED data as a portion the Aim Level, such as the Daily Allowance,
   b) Optional and/or parallel electronic means for performing purchase of good(s) preferably by mobile shopping/money transfer interface such as a WAP-system.
      In a preferred embodiment the purchase is automatic or semiautomatic based on selected criteria for PED data-levels considered acceptable by the consumer. The shopping system compares the individual PED values of the products and selects one or several products fulfilling the criteria. In the fully automated versions the automated comparison operation may replace the previous operation 2), display of data.
   c) Optional transfer of product information, preferably PED-data, from the Shop Data Interface
4) Calculating "Emission Balance" based PED-data obtained about the goods (products and/or services) bought and/or consumed
5) Storing the Emission Balance in an "Account of Personal Emission Balance", which may be located in PECD or
   a) optionally including the step of contacting Personal Emission Trade Interface and
   b) storing information about the balance there and
   c) further giving order for compensation of total or part of the balance
   d) paying for the compensation service, preferably online through the Internet.

The invention is further directed to method of operating PECD by performing the steps described above.

Preferred Formats of PECD-devices

Preferably the PECD is included in a consumer mobile electronic device such as a mobile phone, mobile shopping device, MP3 player, game device, radio, mobile TV, camera, computer, handheld computer, watch, music player, video game, electric notebook or diary, health device measuring a health parameter such as hearth rate and/or steps taken, calculator, or currency calculator or combination thereof. The invention is further directed to electronic shopping devices, which include PECD as the only or major function, preferably major function of the device. The invention is further directed to PECD as the major function of a device and the device optionally includes other functions such as any of the mobile device functions described above. In a preferred embodiment PECD is included as an individual service package or program in the device. More preferably the PECD service is included as a service package in a mobile station.

It is further realized that the PECD may be included in a non-mobile computer system or server such as (home) personal computer, or an outside computer system such as a shop computer or a computer managing PECD belonging to a separate organization, preferably to organization managing or in connection with a PETI-system. In that case the consumer may perform operations at home or use a mobile connection to the non-mobile computer.

In case the PECD is located in a shop computer, the operations may be performed automatically for example after the consumer has been identified in connection with a purchase. The shop may further provide computer interfaces for checking status of the Emission Balance. In a preferred embodiment the shop provides cumulative PED information, preferably Emission Balance when reporting other purchase related data to the customer such as an account status when the customer has a money account at the shop and/or when reporting bonus status of a customer belonging to a bonus program or club or the like. The shop PECD system may be located in or connected to a cash register machine or system and PECD operations may be performed in connection to a SEI-system producing data about items purchased by a consumer. It is realized that personal PECD systems are preferred unless the PECD service and storage in a personal account such as an account in PETI system is available from all shops and preferably also from personal computer or other personal display method.

When a separate organization managing centrally PECD for example in connection with PETI (or part of it) the consumer has an electronic connection, preferably a mobile connection, to the PECD-computer. The consumer contacts the computer and is identified automatically based on the connection or by separate electronic means and/or gives identification information after which the operations may be performed. The consumer give identification/PECD information in context of purchase at a shop and shop may manually or preferably automatically transfer the information to a central PECD device and associated account such as an account in a PETI system.

It is further realized that the PED database or a (current) version of it may be stored in a PECD device or computer used by the customer. This is preferred especially when the consumer prefer savings in potential connection costs. In a preferred embodiment the database is stored as IPGI information in the mobile PECD device. The product group information will allow operations but requires less memory capacity for the mobile device.

Calculator

The calculator part of the PECD is used with calculations and transformations of PED-data (IGPI and IPD).

Calculation of Emission Balance

The major calculation operation is calculation of Emission Balance. The preferred PED-data is preferably represented as or transformed to a percent value of the Daily Allowance level. The emission balance is calculated by subtracting (minus operation) an individual emission value from the Daily Allowance. The values of emissions may be given as normalized values.

Representing the PED data as Daily Allowance

When green house gases and/or other environmental problems are measured the exact amount of harmful environmental effect, preferably amount of green house gasses is associated with production or use of a specified product, may be presented as "daily allowance of greenhouse emission" or here briefly Daily Allowance.

For material or products consumed on a daily basis the daily allowance is preferably calculated as a relation of emission produced for a single product in relation to a globally sustainable emission level per person per day calculated as relative value, preferably as per cent (%), 100% thus corresponding to full level. Current estimates by UN recommend a 60% reduction of green house gas emissions. The sustainable daily emissions would currently then be 0.40 multiplied by total global emissions per the total number of world population per day.

The daily allowance for a product that is useful for a longer time than a day, the "long term daily allowance" is preferably calculated dividing the daily allowance of a single long-term product by the number of days the product is useful on average. The long-term daily allowance mark information should contain the period of time over which is counted. The period of long-term daily allowance may be presented as days or as days, months and years, when preferably a month is calculated as 30 days and year is calculated as 360 days.

In another embodiment the daily emissions of a product are calculated as grams/kilograms per product of emissions after emissions are calculated as average green house gas, preferably as carbon dioxide, based on the scientifically evaluated effect of the various greenhouse gasses. The weight based daily emissions are more concrete, but would require time-based evaluation by customer and would not be as demonstrative and easy to use as % presentation for example in context of a shopping decision.

Method for Calculating Emission Balance from Daily Allowance % Values for a Group of Persons The present invention is directed to calculating Emission Balance values per single customer/person (personal daily allowance %-sum) or per consumption unit of several persons such as family, retirement home for elderly, school or day care centre (consumption unit daily allowance %-sum). Preferably a person belongs to a single consumption unit. In case a person belongs to several units purchasing major green house emission involving products, the personal Emission Balance may be controlled or allocated to the personal account by calculating a portion of the person from the daily allowance per cents from all consumption units the person belongs to and optionally allocating the burden from consumption unit's Emission Balance personal daily allowance %-sum.

Preferably the PECD devices include a possibility for communicating with other PECD devices, the allocations and possible intra group emission trading can be performed by automated operations and/or by semiautomatic operations requiring acceptance by the owner of the device. This is realized so that various units such as points may be chosen instead of %-units yielding a similar result, the % considered to be more effective.

Personal Emission Control Device (PECD) for Daily Allowance Control

The present invention is further directed to PECD, a calculator, calculating with Daily Allowance %-values and optionally transforming one or several consumption units daily allowances %-value/values to personal daily allowance %-value/values or vice versa. Preferably the PECD also stores values. In a preferred embodiment the balance of daily allowance, Emission Balance value is calculated online, when purchase is performed. Alternatively Emission Balance can be calculated as the sum of personal or consumption unit daily allowance % value is after every day at 24.00 o'clock subtracted from 100%. The positive value would indicate that part of the daily allowance has been left over for potential later use, negative value would indicate that the daily allowance was exceeded and this should be compensated later. The information may be stored with date for later consumption evaluation.

Options for Handling Longer Term Emission Balance
Cumulative Balance

In a preferred embodiment the calculator should save the sum of the subtracted positive or negative values after every day as cumulative allowance %. The calculator would preferably change the cumulative allowance % to time units (days and/or months and/or years depending on the size of the value, days are obtained by dividing the cumulative allowance value by 100%). The PECD contains preferably a specific account named as the Cumulative Balance Account (CBA), alternatively the information of the Cumulative Balance can be stored to an account at PETI system, or/and compensated at PETI system. The consumer may then by manual operation or automatically for example monthly balance the CBA account by transferring the excess or deficit amount of daily allowance to PETI system. It is assumed that the balance for most persons in industrial countries is negative and that there is a need for compensation. In a preferred system there is at least a possibility to compensate the lack Daily Allowance % units in the PETI system.

Alternatively the cumulative balance is calculated on line and at the end of a day at 24 o'clock added to the Daily Allowance % of the next day (or days) (when part of the allowance was left) or subtracted from the Daily Allowance % of next day (or days) (meaning adding negative Emission Balance when allowance was exceeded previous day). This system may cause negative (or positive) balance for several days, which may be managed by transferring to large negative or positive amounts to a specific account for the Cumulative Balance, alternatively the information of the Cumulative Balance can be stored to an account at the PETI system, or/and compensated at the PETI system. The user may decide how to manage the Cumulative Balance on a daily bases.

Communication

The PECD communicates preferably with PED, SEI and PETI as shown in FIG. 1. If the PED database or its smaller version is included PECD is in a preferred embodiment operated alone, and preferably using data from product interfaces such as bar codes and RFID-devices. PECD may be further programmed to communicate directly with organization providing compensations of green house gas emissions such as APLCP and SCP according to the FIG. 1.

The PECD device may be further be programmed to communicate with other PECD devices. This would allow emission trading and/or allocation for example between emission balances of persons in the same family or household. It is realized that part of consumption such as housing related emissions are often shared between persons. Such cost may be allocated for example based on data obtained from an electricity or heating energy bill (invoice). The communication between PECD devices id further preferably used for trading of Daily Allowance units obtained by personal operations in reducing $CO_2$ from atmosphere, referred to here as Reduction Efforts. The PECD system includes in a preferred mode including instructions and database for effects of Reduction Efforts and optional verification service for such operations including growing plant materials.

Display

Display means display of data as representation of PED data as a portion of an "Aim Level" such as "Daily Allowance Level", and Optional display of comparative product data including PED data as a portion of the Aim Level.

Data Storage of Personal Emissions

The PECD devices include data storage possibilities such as cumulated balance account (CBA) and account for transfer to PETI services.

Database

In a preferred embodiment the PEACD includes a current or smaller version of PED database, for example including the key IGPI data.

Automated Operations

The invention reveals novel possibility for automated or semi automated shopping based on product data, preferably the preferred product data according to the present invention, more preferably ethical or emissions data according to the invention. In a preferred embodiment the purchase is automatic or semiautomatic based on selected criteria for the data.

In a preferred embodiment the purchase is automatic or semiautomatic based on selected criteria for PED data-levels considered acceptable by the consumer. In these format the shopping system compares the individual PED values of the products and selects one or several products fulfilling the criteria. In the semiautomatic shopping the customer accepts one or several of the products before the shopping is performed. In the fully automated versions the automated comparison operation may replace the display of data step in operating the PECD Product Emission Database (PED)

Product Based Emission Data

Green House Gas Emissions from Production and Sales of a Product

Preferred methods include evaluation of all green house gas emissions of a specific product. When evaluating the production phase, the present invention is directed to total green house emissions for a specific product. Preferred evaluation includes evaluation of emissions related to raw materials, transportation steps, production and sales of the product.

The present invention is directed to the counting of the green house gas emissions of a raw material including all emissions of all possible raw materials used for production of the raw material. The calculated emissions include all emissions including transportation and production and possible material based emissions. The emissions to be calculated are emissions from non-renewable sources.

The transportation related emissions include emission from all transportation related emissions from all raw material and production and product related transportation. The transportation steps are preferably included from production of raw materials to the level of the delivery of the product to the customer.

In case the product or the production step or a raw material causes reduction of fossil green house gas emissions or green house gas emissions from non-renewable sources, the reduction is deducted from the total emissions of the final product, alternatively the reduction of emission can be deducted from the emissions of a specific raw material if the emissions are related to the raw material, in case the reduction is larger than the non-renewable emissions related to the raw material, the emissions of the specific raw material can be calculated as negative emission in further calculations. Material based emissions include emissions of material not based on a specific productions step but emissions spontaneously from a material.

The evaluation is in a preferred embodiment performed at pre-decided practical accuracy level, which may be included as additional information to PED data. In practical level analysis of process steps, which have reasonably small effect are omitted from the analysis.

Calculation of the Emission Per Product Unit

The present invention is further directed to calculating the emissions per product unit. All raw material based emissions are calculated per product unit based on the amount of a specific raw material used for the production of end product unit. In the production phase the raw material emissions may be first calculated per suitable larger amount of products corresponding to a specific amount of end product units. For the calculation of a final per product unit emission, the emission of a larger amount of products is divided by corresponding number of end product units. Alternatively all emission may be calculated through out based on the emission per end product unit. The end product unit is the single unit amount of product sold to the consumer.

Calculation of the Average Emissions and Relative Emission for Quantitative Presentation The present invention is further directed to a method of calculating average per product unit emissions for a specific product. In case there are differences in amounts of products in product units, the product unit emissions are normalized based on the amount of products in a common product unit type. The average emission is calculated as an average of the products available in the markets based on the regular product unit or normalized product units. In case there is large variation in emissions and single or few very high emission products cause bias in the average regular responsible producers, some of the largest values may be left out from average or median emissions may be used instead of the average emissions.

The present invention is further directed to calculation of relative emissions of end product in relation to the average or median emissions of the products in the market. The emissions of the end product are divided by the average or median emissions of the similar end products in the market. In a preferred embodiment the relation is presented as a number with two or three decimals, or in another embodiment as per cent.

Individual Product Group Information (IPGI)

Individual Product Group Information means the best available estimate of general effect per product unit within a group of similar products when available in similar product units or the comparable per weight or volume unit (gram, kg, liter, gallon etc. the unit should chosen as most familiar for the customer). Preferably the PECD device is programmed to calculate the emission per product unit when the product unit differs from the one in database. Additional features are preferred to include correction based on packaging or transport or like if considered relevant for the value of specific product. The IGPI value may be given for example for all products of 1 liter of milk, average newspaper with about 20 pages or for 300 g candies. The IGPI value may be selected to be upper limit or average of the estimated environmental effect, such preferably as GHG-emissions. The PED data may include information how a specific value of IGPI is obtained and how accurate it is. It is realized that exact values can be laborious and difficult to obtain. The IPGI values would allow development of the system when information is not completely available for individual products. Furthermore Quantitative Product Mark classifications would allow advanced producers to show products better than the IPGI.

Individual Product Data (IPD)

IPD is individual product emission data, preferably GHG-emission data, for a specific product per product unit. Preferably IPD is given as Daily Allowance, but database would preferably include alternative format as a mount of $CO_2$-equivalents (as grams or kg:s for example).

PED Management

PED management portal includes access to database and its parameter and preferably an Internet portal available for operator of PED. The management portal includes tools for analyzing and checking data to be included in the database. The PED management further includes maintenance of the computer system, network and connections and information available for consumer using the PED database.

Communication

PED obtains requests of specific product data from PECD (10, FIG. 1) and delivers back information about products (11), similar information (possibly in larger amounts) may be requested and obtained between SEI and PED (61 and 60) for individual shopping processes and/or for storage in SEI database. PED data may transferred to PETI (50 and 51) for example when PETI contains also PECD/PED or SEI interface, and to PIP (70 and 71) when PIP has for example SEI services. Connection to PIP (70 and 71) is also used for transfer raw PED data from PIP.

Information Verification Interface

In a preferred embodiment the information is at least partially obtained from producers. The information verification interface is used for comparison of values of similar products obtained from different producers for example in form of tables listing known product steps and corresponding emissions and/or raw material content of each product.

Estimate Calculation Interface

The management of PEP also contains automated calculation devices, which produce estimates of PED based on for example raw materials content of a product and possible transport costs.

Automated Information Services

The Information services are preferably automated for requested by authorized systems. This requires a step of recognizing authorized system connecting to PED.

Optional Services

The PED may include synergistic services such as optional PETI, PECD, and/or SEI Services, if the service producer would have possibilities and means for such operations.

Database and Computer for the Storage of Data and Calculations

The present invention is further directed to a database containing various emissions of production of a single product. The invention is further directed to automated method for calculating the per end product emissions based on the calculation per end product using the database of the emission information and information how these emissions relate to the amount of end product. The invention includes further computerized calculation, preferably automated or semi automated calculation, of the average emissions and relative emissions.

In a preferred embodiment the invention is directed to a database containing information about the average emissions and relative emission of various products of a specific product type. Furthermore the present invention is directed to the database containing the emission information of multiple product types. Preferably the database contains the information (IPGI and/or IPD) about a) key products with regard to GHE or b) most of the consumer products in the market and even more preferably at least in product group level about two thirds of the preferred products or of about 90% of the preferred products, and even more preferably of 95% of the products in the market and most preferably about practically all products in a specific market. Preferably the invention is directed to a database containing emission data of most daily used consumer products or product groups available from supermarkets or other shops to average consumers on a market. The invention is further directed to calculation tool in PECD or SEI for estimating effect of a product by its raw material content and possible transport.

Personal Emission Trade Interface (PETI)

PETI is an interface or service provider between individual consumers and compensation service providers such as SCP or APLCP, FIG. 1. The interface is useful because the personal emission amounts are in general relatively low in comparison to international emission trading and the transactions require expertise and time. PETI buys units of reduced carbon dioxide in the atmosphere, or reduction of its production from a SCP, typically a smaller scale service provider, or reduction of carbon dioxide production from APLCP-organization such as World Bank or Emission Trading system of EU. The carbon dioxide units are sold to consumers using the PECD system for compensation of Daily allowance or Cumulated Balance needs. The trading system preferably provides information and alternatives of the compensation means. PETI may include integrated additional services such as APLCP and/or SCP Accounting PETI system includes accounts of multiple consumers, optionally also accounts of producers (PIP) for partially or totally compensating the emission, using the system. PETI has accounts at emission trading to obtain equivalent amount of $CO_2$-emission rights. The system charges for carbon dioxide equivalents bought for compensation of emissions.

Individual Accounts

Individual personal accounts of Emission Balance, especially Cumulative Balance Account or copies thereof may be stored in PETI. PETI includes accounts of individual consumers for compensation of emission. Copying data about every transaction to PETI is especially preferred when the systems need verification and control, for example in the format of system which allows public selling of carbon dioxide emissions to PETI or other consumers.

Communication

PETI receives information of accounts from PECD (30, FIG. 1) and confirms back obtaining the information and possible compensations (31), similar information may be obtained from PIP (not market, possibly in larger amounts). Verification information may be delivered from SEI and PED and confirmed to be obtained (41 and 40; 50 and 51) for individual shopping processes. Connections APLCP (90, 91) and/or SCP (100,101) are used for obtaining emission rights.

Shop Emission Interface (SEI)

The present invention is further directed to SEI system as "partial calculators" calculating a partial sum of the daily allowance %-values from a group of products purchased in a shop.

Providing Product Data by SEI-system

Product Identity Data

SEI provides, if PED-data is not available, product identification data in context of purchase for example in electronic form from a cash register. PECD may use this for communication with PED.

IPGI/IPD-data
SEI may provide IPGI/IPD-data from PED system.

Alternative/Compensated Products (AGP)

In a preferred embodiment the SEI system provides information of alternative products before purchase and/or a possibility to compensate the emissions of the products in context of a purchase. These may be preprogrammed automated operations requested by PECD.

Cash Register Machine Associated SEI-systems

The computer providing SEI-information is preferably a cash register or cash register associated computer system calculating sum daily allowance %-values associated with the products sold. Preferably to a total daily allowance value of the products and long term allowance values with their specific time periods of long term allowance products. Additionally the preferred SEI-systems include means for transferring information to personal calculators. The transfer methods include printing of values as numbers, printing of coded values preferably when coded as bar code values, or coded in small electronic devices such as RFID-devices, electronic transfer of values preferably through blue tooth or other wireless methods, electrical transfer involving transfer together with other payment related information such as transfer to a customer with credit card or bank card or bonus card information. When a print of values is used the personal device such as PECD or service computer at shop preferably includes a scanning device for collecting the printed information.

It is further realized that shopping may occur remotely through Internet or as regular mail order and the emission data and related information may be send by email or like, or by phone or text message. The PECD device may optionally include means of reading mobile data, and/or emails/or text messages coded to give product data.

Communication

SEI receives information requests from PECD (20, FIG. 1) and deliver PED data and/or product identity information (31). PED-information may be obtained from the PIP and confirmed to be obtained (80 and 81) and/or from PED (60 and 61). Verification information may be delivered from SEI to PETI and confirmed to be obtained (41 and 40) for individual shopping processes.

Product Connected Identification and PED-data

It is further more realized and preferred that the PED-data may be connected to the product interface including bar code and/or other machine readable (can be scanned) data such as quantitative product/environmental mark and/or Daily Allowance mark and/or data specifying the product group or individual product and/or RFID-data obtainable for consumer for manual handling and transferring to PECD.

Alternatively in a preferred embodiment the data is transferred automatically from product package interface to the PECD-device when PECD includes system for scanning and interpreting machine-readable data such as bar code and/or other defined markings and/or system for reading RFID data. Multiple methods for reading bar code data and RFID data by mobile devices have been published.

It is further realized that bar code and/or RFID data (used regularly for logistics of shops/production) can be read by PECD device, e.g. mobile phone equipped with a camera for reading bar codes as described by scientist of VTT, Finland (PCT published 12/2005). The data can be further be used for identification of the specific product and then the identity for search of corresponding PED-data from PED database.

Producer of Individual Product(s) (PIP)

IPD of Own Products (Own IPD)

The producer of individual products will provide (at least for beginning) voluntarily emission information of their products for PED databases and/or for SEI systems. The advanced products may have a benefit in the markets.

IPD of AGPs

The producer may further provide alternative or emission compensated products and information about these for PED databases and/or SEI systems.

Optional SEI and PETI Services

The producer may also offer SEI services in context of direct sales of products. The producer may also include Product information to the product. In a preferred embodiment the producer offers the PETI service or a connection to the PETI service in connection with purchase such as Internet shopping allowing simultaneous compensation of emissions if required by the customer.

Communication

PIP communicates especially with the PED (70 and 71) and provides information about its products including alternative and/or emission compensated products by SEI (80 and 81) and by potential product connected information. Furthermore PIP may transfer information directly to the PECD for example in context of internet sales. PIP may also connect to PETI or APLCP or SCP for precompensating emissions of a product. In a preferred form of transaction the shop or internet shop of PIP includes connection to PETI for a compensation operation simultaneous with the purchase.

Authority or Private Large Compensation Provider (APLCP)

APLCP sells reduction of GHG-emission production preferably through a PETI interface. APLCP-organization includes e.g. World Bank, Emission Trading system of EU and large US or Japanese brokers of emissions.

Accounting and Compensation

The APLCP-organizations may have specific accounts by which the ordered emission rights or carbon dioxide equivalents are transferred on request to PETI system. The PETI system provides monetary compensation by suitable means preferably by online operation.

Service Compensation Provider (SCP)

SCP sells units of reduced GHG-emission in the atmosphere, or reduction of its production preferably through a PETI interface. SCPs are typically service providers in contrast to large broker organizations performing operations directly with $CO_2$ and/or other GHGs.

Accounting and Compensation

The SCP-organizations may have specific accounts by which the ordered emission rights or carbon dioxide equivalents are transferred on request to PETI system. The PETI system provides monetary compensation by suitable means preferably by online operation.

Systems, Devices and Key Parts thereof

The present invention is directed to a systems and devices according to the present invention, more preferably when the said system or device includes means for storing information of personal green house gas proportions bought from trade of green house gas emission permits. The present invention is further directed to a calculator according to the present invention, when said calculator includes means for buying personal green house gas proportions from trade of green house gas emission permits.

The present invention is further directed to a transaction process of buying private consumer goods by a regular consumer when the seller requests a specific amount of greenhouse gas emissions permits, and the specific amount of permits are taken (subtracted) from a personal account of the consumer. In a preferred embodiment the subtraction is performed either as voluntarily process or in another process as authority regulated controlled process. At least in the latter case there is a need for a data security process in form of encryption or other means.

In a preferred embodiment the account is the daily allowance for the person and possible permits bought by trade of permits. Preferably the transaction process further includes process for recording of information of the transaction for possible control of the process. In a preferred embodiment the transaction process is performed using the PECD according to the present invention.

There is a variety of electronic payment systems and technologies which are commonly known. Systems and technologies directed to delivering food calory etc. information has been described in WO2004/107227, U.S. Pat. Nos. 5,412,564 and 6,387,049. Bar code reading technologies by mobile devices has been described e.g. in WO2005/124657, and applications cited in its international search report (US20020102966, US 20030218069, U.S. Pat. No. 6,688, 525).

It is realized that similar computer technologies/device design can be used for present invention for constructing PECD devices and/or SEI systems for delivery of product based green house gas emissions. The food data dos not describe indirect effect to consumer and the use of the systems for present invention was not obvious, furthermore effect of food it cannot be compensated by monetary transactions as by PETI systems.

The invention is further directed to use product names and/or brand names, or number forms of bar codes or scanned product logos as product identification for obtaining information from PED databases, in a preferred embodiment text message or email is used for obtaining information from PED database. The database may provide information of alternative products with the same product names and/or brand names, from which the user can select the exact product which he or she would like to get the information about.

Further Preferred Aspects of the Invention

Alternative Presentation of the Emissions

In a separate embodiment the invention is directed to presenting the emissions in terms of cost(s) as money in case of compensation by alternative or a selected compensation means. The cost of compensation is calculated by the cost of compensation and actual or estimated product based emissions. In a preferred embodiment the emission and/or compensations/needs for compensations are presented both as in one of following ways, preferably at least two ways selected, and most preferably they are selected form the group: part of daily (or other time based) allowance, and/or as sum of money and/or as portion (preferably %) of emission of average product. The preference of the representation depends of the needs associated with the operation in use according to the invention. Monetary expression together with time based allowance such daily or annual allowance is preferred in context of compensation operations.

Personal Compensation Efforts

Preferably the system includes possibility for the customer to compensate emissions by personal measures such as accumulating carbon in biomass growing trees or producing renewal raw material based fuels. In a preferred system there is verification connection to verify the value of the personal compensation operation by a reliable authority or consultant. Preferably this verification uses computer connections, and verification means according to the invention such as book keeping verification and practical verification means and the verification may include visual material provided through a data network as described for other practical verification.

Alternative/compensated Products (AGP) and Processes

Is realized, that providing of alternative and/or emission compensated products, would serve customers and reduce the need of compensating and/or calculating emissions. The invention is therefore directed to effective means for providing information about emission compensated products and/or possibilities for compensation in context of the purchase.

Compensation of Emissions in Context of Purchase

In a preferred embodiment the invention is directed to systems, wherein the emissions are compensated in context of purchase. This may occur by the PECD system, manually or as an automated process.

Compensation Mode in Context of Purchase

In a preferred embodiment compensation is performed by shop preferably by a SEI-interface.

It is realized that the compensation can be performed by shop/commercial service or product producer in context of purchase without PECD device or similar mobile device. The compensation can be performed in context regular shopping when the cash register or corresponding device contains means for compensation.

Timeline of Compensation

It is realized that compensation may be decided and communicated for individual products and/or for a group of products such as selected products considered to have especially large emissions. In a preferred embodiment the compensations is performed for a total set of products "the shopping" purchase together after one shopping event. It further realized that shop/shop interface may accumulate compensation information and the compensation may be performed for larger lot of shoppings for example timely bases such as for a week, two weeks, one month, three, six or twelve months (/year). When compensation is performed by the shop for a lot of shoppings or shoppings performed during specific time period, this may be performed in a shop as described above or the communication may be performed in internet between computers.

Multi Level Compensations

In a preferred embodiment the system includes at least two compensation levels. The preferred compensation levels are based on preferably to the level of emission relative to average product among similar products with the same amount of the product and/or the cost of compensation. In the embodiment of cost based levels the emission based compensation may be also based on absolute amount of emission, measured for example by equivalents of $CO_2$. The cost of compensation may be relative to the price of the product or absolute amount of money to be used for compensation. In preferred automatic mode shopping the device (PECD/SEI) select desired compensation level based on pre-selected criteria. The customer may select desired emission based on amount or level of emission to reach desired level of personal emissions, preferably trying to achieve personal emission levels, which would allow reducing or stopping global warming caused by green house gas emissions associated with the products.

The preferred emission level control includes one or several of the following operations 1) adjustment of compensation based on the emission level, absolute or relative cost,
2) providing information to customer about emission level of compensation
3) providing possibility to select a product based on emission level
4) possibility reduce or increase the amount of product based on the emission level effectiveness.

Alternatively the preferred compensation level can be chosen completely or partially cost based, the cost based levels can be used to control the cost of compensation related to economic goal or position of the customer. The partial cost based compensation level includes preferably maximal compensation level related to the cost of the product of a product or maximal compensation cost for a product or shopping or set of shoppings. The maximal level is preferably used be used for preventing the customer from exceeding his/hers budget. In an additional sub application the decision making about the compensation is connected to the level of personal budget system controlled by computer of the customer. In case the budget would be exceeded by the compensation, the system preferably consults the customer or adjusts the operation by lowering the cost for compensation by pre-selected criteria. The preferred cost based level adjustment further includes optional checking the relative level of compensation with regard to total price of the product. This would provide additional information to the cost effectiveness of compensation for a product type.

The preferred price level control includes one or several of the following operations 1) adjustment of compensation based on the cost level, absolute or relative cost,
2) providing information to customer about cost level of compensation
3) providing possibility to select a product based on cost level
4) possibility reduce or increase the amount of product based on the cost level effectiveness.

The invention is in a preferred embodiment directed to personal budget systems collecting information about shoppings, which may be also used independently of other parts of invention. The personal budget system preferably collects price information from the shoppings, preferably on line from cash register or from SEI-system. Preferably the personal budget system also collects information about product names, quantities and types. The personal budget system contains optional program means to compare the costs and items from previous shoppings to observe changes of costs of regular predicts consumed and occasional shopping items. The system can adjust personal budget on line based on items to be bought. When the budget is adjusted the budget system is in preferred sub-embodiment adjusted to check possibilities of compensation of emissions or additional possibilities for compensations.

The preferred process of compensation includes at least following steps:
1. Providing from the shop to customer information about compensation possibility and
   a) Optionally possible levels of compensation of the levels of the total amount
      of the product(s) associated emission such as 100% (total), 75%, 67% (two thirds), 50%, 33% (one third), 25% or 10% compensation, or possibility for any selected part of compensation, especially selection of a compensation corresponding to
      a certain fixed amount money or
      a fixed proportion of the price of the product
   b) Information about the cost compensation for total compensation and/or cost of compensation on various levels of compensation, preferably in terms of levels of the total amount of product associated emissions as above in a) and/or as fixed part of price of the product
2. Receiving the information by the customer and making decision by the customer.

In a preferred embodiment the information is obtained by a mobile device of customer or displayed by device connected to cash register, and more preferably the decision about compensation is either semiautomatic or automatic based on criteria pre-selected by the customer. The semiautomatic process would preferably require displaying a suggested compensation level or compensation levels to customer and a confirmation by customer the acceptance or change of compensation level by signal such as preferably pressing or otherwise manipulating a button or an icon or like interface connected to the displaying device or by vocal communication 3. Providing from the customer to shop information about willingness to compensation and information about use of total compensation or selected level of compensation based on price of the product. It is realized that shop interface may provide only single level of compensation in terms of level of total emission or price. In this context, the customer informs the shop by acceptance or disapproval of the compensation.

In a manual/non-electronic shopping the customer may provide the information by saying it to cash register operator. The invention is preferably directed to a cash register comprising means for input of compensation information by pressing or otherwise manipulating a button or an icon or like interface connected to the displaying device.

Shop Based Compensation Means

There are several preferred embodiments and aspects directed to specific forms to shop based compensation systems.

There are multiple preferred aspects associated with shop based compensation systems e.g. based on the type of shop and/or merchandise. It realized that the requirements and business are different for example in context of 1. consumer products
   The present invention provides specific advance in control of emissions for large groups of various types of consumer products. It is realized that this is beneficial in comparison to previous compensation ideas. It is especially useful to control energy intensive consumer products such as various food products, or metal containing consumer products. The preferred consumer product system operates in context of shopping of daily/weekly consumer goods such as food and other consumer products from regular shops and supermarkets.
2. energy intensive services such as travelling, especially air traffic
   The present invention provides specific good aspects with regard to most energy intensive transport, which is air traffic. It is realized that some compensation systems has existed for this branch similarly as for car fuels but the present invention provides additional benefit and methods also for this context.
3. selling of fuels, especially vehicle fuels, especially car fuels
   It is realized that some compensation systems has existed for car fuels but the present invention provides additional benefit and methods also for this context.

There are further useful specific aspects in context of compensation systems such as
connection to state level emission control,
additional emission compensation by a non-consumer party
providing book keeping information for customer's own emission control,
providing the information over specific time period,
compensation in context of specific customer identification system,
connections to one or several parts of integrated system of present invention:
   connection to PECD systems,
      connection to PED systems,
      connection to PETI.

It is realized that these aspects are also preferred in context of other compensation modes according to the invention.

Connection to State Level Emission Control

The invention is directed to connection and book keeping of the compensations with regard to state level emission control. It is realized that the personal compensation/emission reduction effects state level emission control efforts such as one regulated with EU emission trading. It can be further realized that the verification and book keeping of personal emission may be used for giving tax subventions or reductions from environmental taxes. The preferred emission control systems include connection to an account for book keeping of total emission control of a consumer. The total emission control preferably includes information about following: information about consumer with name or with a verification code; information of total compensated and/or emissions replaced by low emission products; information of total emissions by the consumer.

It is realized that the information may be used by authorities in order to follow personal emission and changes in consumer behaviour. It is realized that is useful to direct taxes to consumption and it is useful to give tax subventions and reductions for persons controlling their emissions.

It is realized that the connection to stated level emission control system would be useful and is preferred in context of all emission compensation means according to the invention.

Additional Emission Compensation by a Non-consumer Party

In a preferred embodiment the invention includes additional compensation of emission, which would supplement the emission compensations/reductions according to the invention by a non-consumer party. In a preferred embodiment the state authority pays additional compensation on the top of the compensation performed by the customer. In another optional preferred embodiment the state authority may provide tax reduction for the product compensated by the customer, this compensation may be programmed to cash register system/SEI system, in context of accepting the compensation by the consumer.

It is realized that the additional compensation may be performed by the advertising reasons by a third party collaborating the party maintaining the compensation system. The additional compensations are preferably included as separate item in the emission book keeping.

Providing Book Keeping Information for Customer's Own Emission Control

Regardless of the emission control system used by the customer, it is useful to provide the emission information for the customer.

In a preferred embodiment the shop compensation system provides information about cumulative emission and compensated emissions as PECD system. It is realized that the account for personal emission and compensation thereof is in a preferred embodiment programmed to shop system. It is realized that at least larger shops effectively function in emission trading according to the invention.

Providing the Information Over Specific Time Period

According to the present invention it is useful to provide emission information over specific time periods. This is preferred in order to demonstrate effect of compensations over time. This is also useful in context of bookkeeping with regard to authority control.

Compensation in Context of Specific Customer Identification System

Compensation is especially preferred in context of specific customer identification system such as card or bonus system, alternatively the identification may be based on use of identification in context of use of credit card or bank card or other payment system involving personal identification. Preferably the shop system such as cash register and/or SEI system is programmed to use the identification.

In alternative method the information of the need of compensation is transferred to provider of the payment system such as credit company and bank and the further provides emission compensation based on the based on the pre-selected or programmed criteria or provides customer a possibility for compensation by providing the information to computer, internet portal or mobile device for selection of suitable compensation means.

It is realized that these systems may provide emission control by identification of the customer by specific customer identification Connections to One or Several Parts of Integrated System of Present Invention:

The invention is directed to shop based and/or as inventive alternative for it throughout the invention payment system based compensation systems. It is realized that the shop/payment system based compensation systems benefit from the following connections to preferred systems according to the invention allowing effective emission control
    connection to PECD systems,
        connection to PED systems,
        connection to PETI, Verification of Compensation Means Verification of Compensation by Verification Information to Customer It is realised that in order to keep customers trust compensation means should be easily verifiable. The verification means occur on various levels, which preferably includes
    a) book keeping verification and
    b) practical means for verification compensation operation.

The Book Keeping Verification

The book keeping verification means that the monetary transactions from customer to service provider and possibly further to compensation means can be verified. The book keeping verification provides information about the monetary transactions in the process. The verification can be provided as book keeping information, which can be verified by one or both levels as follows:
    a) by independent accountant reporting essential information about the use of the monetary (or equivalent/carbon equivalent) transactions provided
    b) by providing the book keeping information by internet. The preferred formats for internet information delivery are open access or access with given pass words. When the internet information is in open access format the identity of individual customers is preferably protected by verification codes for each transaction, if the customer does not specifically wish to provide their public identification information, such as name.

The verification code is a unique string of number/letter/symbols, which is given to the customer in context of transaction with compensation. The customer may check that the money or equivalent is correctly spent by checking the information provided with the verification code. Part of the code is in a preferred embodiment customer specific to facilitate the search of transactions by a specific customer. In case verification code is used the computer system includes database about confidential name/personal information and corresponding verification codes and data about non-confidential name/personal information, which has been allowed by the customer to be displayed in context of verification of a compensation process. The system includes preferably means for comparing identity information from a compensation operation with the database, and when the customer has provided identification code for display in context of compensation, the data about compensation is displayed with the code data. It is realized that the customer may provide additional information with the verification code for comparison between populations groups (region, age, sex etc., as indicated below).

It is realized that part of the customers may be willing to show their names and possible other identification information such as hometown and home country/state. It is further realized, that in a preferred embodiment the personal information can be specified by adding to the information additional identification information. The preferred additional information is preferably selected form the group: first name (s) or initials, sex, age, or residence information such as hometown and/or home country and/or state, or other identity information, which is provided by the customer to specifically identify the customer. It is realized that personal information with names, residence and age information would encourage other person to join the system. The preferred system includes optionally statistic about how large part of population (preferably by % figures) is participating the compensation or uses other parts of present invention to achieve the positive effect, especially with regard to green house effect. The statistic would optionally also indicated how large portion of an age group, or a sex, preferably in specified regions, is using one or several parts of the invention, preferably the compensation part.

Practical Verification of Compensation Operation

The invention is directed to verification including possibility for the customer to observe the compensation operation and personal compensation on practical level. The practical level compensation verification provides information from the practical compensation process.

In a preferred embodiment the verification information includes visual information from the practical level compensation operation. The preferred visual information includes pictures, photographs and/or moving pictures. In a preferred embodiment moving pictures such as videos are provided from the site of compensation. More preferably the information is provided on line, preferably by an Internet connection or equivalent. In a preferred embodiment the practical compensation event or project is documented by cameras connected to internet (web-cameras) and the information is provided by the Internet to the customer.

The practical information showing the compensation preferably includes information about personal compensation efforts. The personal compensation efforts are preferably shown at the site of compensation. The preferred for of showing the personal compensation include showing customer name or other identification information in context of showing information of the site of the compensation. It is realised that the verification information maybe confidential verification information such as confidential verification code. The present invention preferably shows a site of compensation and the identity information about the customers contributing to the site of compensation. For example site may include growing trees in order to reduce carbon dioxide in atmosphere and a public display such as a plate or a sign at the site including identity information of the customers, preferably the trees and the display are shown simultaneously by the internet connected camera to the customer. The process verification optionally further include providing information, such as localization, of the site of compensation in order to further assure the customer that the compensation is performed properly.

Internet Portal for Emission Control

It is realized that a data network portal is a preferred format of emission control means by person. The internet or other data network portal, briefly network portal, may include personal, preferably pass word/other identification controlled accounts, which may be used as PECD-devices according to the invention. In this format of the invention the customer or shop has connection to the network portal. The system would also contain a network connected device for accepting operation such as compensation operation or other operation according to the invention or alternatively the information is collected for later operations, especially compensations of emissions.

It is realized that not all persons are interested for follow-up their emissions. Therefore in a preferred embodiment an estimation of personal emission per specific time period, preferably longer time period, such as day, week or month, year or e.g. five years, ten years, 20 years, 30 years or 50 year or estimated rest of normal life is produced, preferably year or multi year bases. Preferred internet portal for estimate includes calculator for emission, and preferably it is used over a specific time period to produce a longer term estimate, preferably most emission creating part of consumption are specifically estimated, such as home heating or cooling, traffic, especially air traffic.

In a preferred simple format the customer makes compensation based on personal emissions for longer time such as year or many years or rest of life bases. In a preferred system this compensation includes follow-up based on changes in major factors effecting the emissions and connection to state emission control. Preferably the system includes verification means for the compensation according to the invention and optionally a connection system providing information is changes in effects of various technologies in personal emission for possible change of consumption estimate by the customer and need for the compensation.

Cash Register Machines for Emission Control

It is realized that the shop-based methods according to the invention involve a specific type of cash register machines, with novel technical features useful for the methods according to the invention. The invention is especially directed to cash register machines useful for compensations of emissions and/or controlling the amount of personal emissions and/or providing emission information for personal emission control, preferably by a PECD system.

The invention is directed to a Cash Register Machine comprising an icon or button for adjusting the compensation level preferably at context of paying shoppings. The icon is preferably a position on a touch screen display. It is further realized that the icon may be a position on a computer display, which can be selected by moving a cursor or equivalent on a computer display, it is further realized that the operation may be selected on a display by other means of identifying on operation by a cash register machine, by system obtaining information from the person operating the cash register system.

The invention is directed to the Cash Register Machine, wherein touching of the icon or button provides price of compensation of the emissions of i) a single product selected preferably on the screen, or which was the last product or product group indicated to the cash register by product identification such as bar code, rfid or like or ii) total shoppings.

The invention is directed to the Cash Register Machine, wherein the icon is a position on a touch screen display.

The invention is further directed to the Cash Register Machine comprising operator such as icon or button, which accepts the compensation operation and starts the compensation operation, preferably with a PETI system. The display preferably further provides verification information from a successful compensation operation. The preferred operators on the display or in the machine further includes operators for selecting preferred compensation program alternative such as type of compensation and/or preferred provider of the compensation (e.g large scale or small service provider according to the invention). In a preferred embodiment the operators are organized in hierarchy so that the compensation mode is selected by first operator (icon or button) and the alternatives for compensation level and/or type of compensation are displayed separately, e.g as a new window) or activated on screen after activating the first operator.

The invention is directed to the cash register machine according to the invention, wherein the machine comprises at least two buttons or icons or a button and icon for adjusting the compensation level preferably at context of paying shoppings. The icons or buttons are together referred to as operators.

In a preferred embodiment the cash register machine comprises at least two operators being button(s) and/or icons(s) which correspond to different levels of compensation.

The invention is further directed to a cash register machine that comprises at least three operators being button(s) and/or icons(s) which correspond to different levels of compensation. It is realized that two or more operators allow selecting more compensation levels e.g. as per cent compensation intervals such as 25%, 50%, 75% or 100%. In a preferred embodiment the cash register includes a possibility to insert specific desired percent figure for the compensation, this may be preformed by the person operating the cash register on request of the customer.

The invention is further directed to a Cash Register Machine, which include a connection to
  i) a database of customers desiring compensation emissions of shopping based on preselected criteria of customer,
  ii) means of identifying customer e.g. based on customer card or credit card
  iii) a program performing comparing the customer identification and the database of customer desiring compensation of emissions and performing the compensation operation based on the comparison, preferably compensation is preformed by contacting a PETI system.

The invention is further directed to a method of compensating personal greenhouse gas emission, wherein a cash register machine according to any embodiment of invention or combination thereof is used for performing the compensation.

The invention is directed to the compensation method according to any aspect of the invention, wherein the cash register machine includes a connection to at least one PETI system. The invention is further directed to the compensation method according to any aspect of the invention, wherein the cash register machine comprises a connection to at least one PECD system.

PECD Device and Display for PETI Operations

It is realized that the shop-based methods according to the invention involve specific type of PECD, with novel technical features useful for the methods according to the invention. The invention is especially directed to PECD useful for compensations of emissions and/or controlling the amount of personal emissions, especially having contact with PETI and/ or SEI systems and/or obtaining emission information for personal emission control, preferably from a SEI and/or PED system/database. The invention is further directed to any personal device, preferably a mobile station for compensation of emissions, preferably for preferred product type or types, according to the invention, the devices are referred as PECD like devices or PECD devices including specific PECD devices according to the invention. It is realized that PECD devices are useful for emission compensation even without methods for accounting and controlling personal emissions.

The invention is directed to PECD comprising an icon or button for adjusting the compensation level preferably at context of paying shoppings. The icon is preferably a position on a touch screen display. It is further realized that the icon may be a position on a computer or mobile device display, which can be selected by moving a cursor or equivalent on a computer display, it is further realized that the operation may be selected on a display by other means of identifying on operation by PECD, by system obtaining information from the person operating the PECD.

The invention is directed to the PECD according to the invention, wherein touching the icon or button provides price of compensation of the emissions of i) a single product selected preferably on the screen or display, or which was the last last product or product group indicated to the PECD by product identification such as bar code, rfid or like or ii) total shoppings.

The invention is directed to the PECD, wherein the icon is a position on a touch screen display.

The invention is further directed to PECD comprising operator such as icon or button, which accepts the compensation operation and starts compensation operation, preferably with a PETI systems. The display preferably further provides verification information from successful compensation operation. The preferred operators on the display or in the machine further includes operators for selecting preferred compensation program alternative such as type of compensation and/or preferred provider of the compensation (e.g large scale or small service provider according to the invention). In a preferred embodiment the operators are organized in hierarchy so that the compensation mode is selected by first operator (icon or button) and the alternatives for compensation level and/or type of compensation are displayed separately, e.g as a new window) or activated on screen after activating the first operator.

The invention is directed to the PECD according to the invention, wherein the machine comprises at least two buttons or icons or a button and icon for adjusting the compensation level preferably at context of paying shoppings. The icons or buttons are together referred as operators.

In a preferred embodiment the PECD comprises at least two operators being button(s) and/or icons(s) which correspond to different levels of compensation. The invention is further directed to PECD, which comprises at least three operators being button(s) and/or icons(s) which correspond to different levels of compensation. Further more the invention is directed four and five operators for adjusting the compensations. It is realized that two or more operators allow selecting more compensation levels e.g. as per cent compensation intervals such as 25%, 50%, 75% or 100%. In a preferred embodiment the PECD includes possibility to insert specific desired percent figure for the compensation by the person owning and using the device. The invention is further directed to a program to set a standard compensation level for automated compensation operations and option or possibility to alter the standard levels.

The invention is further directed to a PECD, which includes following part or connection to these
  1) database of preselected criteria of compensation level and/or preferred compensation programs,
  2) means of identifying customer e.g. based on customer by a pass word
  3) program performing compensation by contacting a PETI system.

The invention is further directed to a method of compensating personal greenhouse gas emission, wherein a PECD according to any embodiment of invention or combination thereof is used for performing the compensation.

The invention is directed to the compensation method according to any aspect of the invention, wherein the PECD includes a connection to at least one PETI system. The invention is further directed to the compensation method according to any aspect of the invention, wherein the PECD includes connection to a cash register machine and/or SEI system.

Quantitative Product Mark (QPM)

The present invention is in a preferred embodiment directed to novel quantitative product marks (QPMs). The QPMs are generally useful for transfer of quantitative information to consumers. The QPMs are especially preferred to be used in context with integrated personal emission control systems such as the integrated system IPECS according to the invention and parts of it.

The invention is especially directed to the display or transmission of quantitative product marks on PECD devices or systems, and by SEI systems and cash register systems. It realized that the QMPs are effective way of displaying information about the product properties, in a preferred embodiment greenhouse gas emissions.

QPM Connected to IPECS

In a preferred embodiment QMP is used as a part of IPECS. Preferably the QPM mark is normalised to Individual Product Group Information (IPGI) so that it would give approximate emission level, for example 80%, 60%, 40% or 20% of average upper limits of a specific product type. The consumer can then calculate/obtain the emission level corresponding to the product type 1) manually calculating from PED data
2) or semi automatically by selecting the product group and QPM-level from PECD-device, and getting data from automated calculation operation
3) or by getting the data in connection of product information from SEI system or by another product interface including bar code and/or RFID-data obtained from shop or directly from product package to the PECD-device.

It is further realized that the PED-data is useful for defining values of the QPM-type environmental marks including quantitative environmental marks preferably sun/cloud marks and Daily Allowance marks. It is further realized that other environmental and/or ethical such as labour data may be stored like PED-data for GHG-emissions and use for QPM-presentations and interactions with corresponding integrated data systems.

The present invention describes product marks demonstrating either positive or negative properties of the product. Moreover the present product marks show the property quantitatively. The quantitative aspect is important for problems, which are effectively not solved by setting a single standard level, and giving information that a product is either good or bad in this respect. The quantitative property allows the consumer to compare effects of products and make a decision based on the observations. It will also encourage producers to compete in delivering more indirect benefits for the customers. For example with regard to environmental factors giving quantitative information would direct consumption and product development towards more environmentally friendly products.

To deliver the maximal amount of information, the mark should be simple and easy to observe, remember and understand all around the world. The demonstrative property of the product should be based on most common and most robust observation psychology based forms and shapes. The negative or positive effect should be observable even by persons less well educated or interested in the problem for which the mark is designed.

The Quantitative Effect Associated with the Mark

In a preferred embodiment the quantitative effect of the mark may be presented by increasing the size, relative size or number of the symbol or symbols indicating a negative and/or positive effect associated with the product. Preferred symbols in this category are cloud and sun symbols.

In another preferred embodiment the quantitative effect is indicated by a change of a geometric shape of the mark or part of the mark. Preferred change of the mark includes change of curvature of a bend line and optionally straight line. In a preferred embodiment this type of sign is analogous to human face and the line represent the mouth of the sign. Another geometric line representation is an angle mimicking a speedometer of a car.

In a preferred embodiment the sign contains a structure or elements indicating both the positive and negative effect of the product. In a preferred embodiment the positive effect is presented by a single positive sign indicating that a product is practically devoid of problems, and the negative effect is presented with a quantitatively increasing amount of negative signs. In another preferred embodiment the presentation of negative signs includes a hint of the positive sign and may be proportionately increased when problem associated with the product is decreased.

The quantitative effect may be presented exactly analogously adjusting the change in the mark exactly relative to the value of the property of the product indicated. The value of the property of the product shows the rating of the product.

The quantitative effect may be presented as categories or intervals. The scale can be selected in various ways optimised to encourage producers to lower the problematic property associated with the product. The product mark rates the product to a certain category. For example five symbols representing maximal problem or current average problem associated with a product type, four symbols representing 80% of the level of problem, 3 symbols representing 60% of the level of the problem, 2 symbols representing 40% of the problem and one symbol representing 20% of the problem, additionally positive sign can be used representing 0% problem level associated with a product. Preferably the symbols presenting the problem are cloud symbols, preferably representing the Climate mark indicating green house gas emission, preferably positive sing in this context is the sun symbol. Alternatively these intervals for Climate mark are represented by both sun and cloud symbols, for example, by two cloud symbols for maximal problem, one cloud for 80% of problem, one cloud or sun partially covered by one cloud for 60% of the problem, one sun symbol for 40% of the problem, two sun symbols for 20% of the problems and optionally three sun marks for 0% of the problem.

With a face symbol, where about half a circled line upwards represents the smiling mouth of a face symbol, represents a positive situation without the problem or an acceptably low level of problem, a half curved line, i.e. curved less than half a circle and more than a straight line represents 20% of the problem, presenting a smaller smile, a straight line indicating a neutral face, presenting a level of 40% of the problems and a slightly curved line downwards presents 60% of the problems associated with the product, the face appearing unhappy with mouth ends pointing down, and a line of half a circle turned downwards representing 80% of the problem and a face looking very unhappy.

In case of either an exact analogous or an interval presentation of the quantitative effect, the exact value indicated, may be additionally presented numerically preferably as a per cent value or a proportion of the value 1.0, most preferably as a number.

Traditional Diagrams and Marks Quantifying the Effect and Combined Use

The present invention is further directed to other more traditional quantitative means for indicating the quantitative aspects of the mark. The traditional methods for indicating a quantitative aspect of a mark includes the use of diagrams indicating the quantitative level of problem associated with the problem. The diagrams may indicate the level of the problems by bars, diagrams, or circles with sectors indicating the level of problem (pie diagrams). In a preferred embodiment such traditional means of conveying quantitative information are presented with a symbol indicating the problem as described by the present invention. Preferred symbols to be used with the traditional diagrams include a symbol or symbols of a Cloud mark, a Cloud-sun mark and a Sun mark and the Face mark.

Mark Level and Value

The relative amount of the problem is here called mark level, which indicates the level reached by the product in marks showing the quantity of the problem as categories and/or intervals. The mark value is the numeric value of the problem, preferably indicated at least with two presenting numbers, or the mark value is presented by the demonstrative or traditional quantitative presentation of the problem or combination of the numeric and quantitative presentation.

Simplified Presentation on Plastic or Other Moldable Surfaces

The shape-based presentation is preferred in an embodiment because colours may not always be available for cost effective marking of all products. The shape may be presented on a plastic surface as a whole surface shape, as a shape surface higher than the plastic surface or as a shape below a surrounding plastic surface. The shape may also be presented as a line shape presenting the shape. On a plastic surface the line may be higher or lower in relation to the surface surrounding the mark. The whole surface shape may also indicate a dark or a black mark and the line shape as a white or light colour shape.

Preferred universal markings demonstrating positive and negative indirect effects of products:

Cloud Mark/cloud-sun Mark

Demonstrative Effects

On a psychological level most human beings do not like rain, due to possible unpleasant cold and wet feelings associated with it. A simple symbol for this is a cloud, especially a dark cloud associated with unpleasant, stormy and/or dark weather.

Cloud Mark as Environmental Climate Mark

The Cloud mark is preferred as an environmental mark. Most preferably the cloud mark is used as an indicator of green house gas emissions and threat of climate change. The name of the mark is preferably the "Climate Mark" and it could also referred to as the "Cloud Mark". Clouds are produced by consumption of fossil fuel in factories or for example by traffic are known to consumers. In the case the of green house effect/phenomenon great changes of weather conditions including storms are to be expected at least in certain regions of the world, increasing the demonstrative power of the mark. Thus clouds, especially dark clouds or black clouds, present an effective demonstrative symbol especially for the green house gas emission problem. The indirect benefit of selecting a product with as little emissions as possible indicated by the mark would be clear and understandable for a consumer. For additional demonstration of the effect the mark may include a schematic picture of a factory with a chimney delivering the emission to the sky.

Sun Mark

The Sun as a mark for positive, the opposite of the cloud, is an understandable symbol based on everyday change of weather from cloudy to sunny. Most persons would prefer seeing the sun instead of a dark or a black cloud. Clouds of industrial emission may also shadow the sun in every day experience of consumers. Therefore the sun has a demonstrative effect opposite to that of the green house effect.

The Marking System Including Both Sun and Clouds or a Cloud

The sun mark may be combined with the cloud mark. In a preferred embodiment the sun without the clouds can be used for indicating situation when there is no problem and maximum amount of benefit associated with the product. The preferred combination includes several clouds and a sun located on the left or the right behind a cloud. The sign indicating a low level of problem, and thus a high level of indirect benefit for the customer associated with the product includes only one cloud behind which part of the sun can be seen. The signs indicating increasing amount of the problem contain increasing amount of cloud shapes. In another combination the size of the cloud covering the sun is increased, and in another combination a larger part of the sun shape is covered by a cloud mark indicating an increased problem.

Quantitative Effect Shown by the Mark

The positive effect may be shown quantitatively by proportionally reducing the size of the cloud, or the number of clouds, when two or more clouds are used, or size and number of clouds. In a preferred embodiment the demonstrative effect is produced by changing the colour of the cloud from back to white, through a grey scale. A white cloud would indicate no problem or a low level of problems and a black would indicate a high level of problems associated with the product. The change of size or number of clouds and the colour from black to white can be combined to increase the effect of the mark.

Additional Daily Allowance Mark

When green house gases and/or other environmental problems are measured the exact amount of harmful environmental effect, preferably amount of green house gasses is associated with production or use of a specified product, may be presented as "daily allowance of greenhouse emission" or here briefly daily allowance.

For material or products consumed on a daily basis the daily allowance is preferably calculated as a relation of emission produced for a single product in relation to a globally sustainable emission level per person per day calculated as relative value, preferably as per cent (%). Current estimates by UN recommend a 60% reduction of green house gas emissions. The sustainable daily emissions would then be 0.40 multiplied by total global emissions per the total number of world population per day.

The daily allowance for a product that is useful for a longer time than a day, the "long term daily allowance" is preferably be calculated dividing the daily allowance of single long term product by the number of days the product is useful on average. The long-term daily allowance mark information should contain the period of time over which is counted. The period of long-term daily allowance may be presented as days or as days, months and years, when preferably a month is calculated as 30 days and year is calculated as 360 days.

In a preferred embodiment the Daily Allowance Mark is used together with another environmental mark, most preferably with the Cloud mark.

In another embodiment the daily emissions of a product are calculated as grams/kilograms per product of emissions after emissions are calculated as average green house gas, preferably as carbon dioxide, based on the scientifically evaluated effect of the various greenhouse gasses. The weight based daily emissions are more concrete, but would require time-based evaluation by customer.

The Face Mark
The Face Mark Used as a Labour Condition Related Mark

There is a growing concern about employment conditions in developing countries. Problems are related to working conditions such as human rights, safe working conditions, long working hours and salary levels, which may be very low. The global economy is developing in process where work moves to countries were human and worker's right are less well developed.

The Face mark is preferably used for indicating quality of labour conditions. The factors of working conditions and salary levels may be combined for example giving 50% weight of the relative working condition level and 50% for the salary levels in comparison to the well controlled European or US markets. As living costs may be lower in developing country the salary level factor may be adjusted to local level when product is sold in the developing country. In case the mark is adjusted to a local market, the sign preferably includes the country or market to which the mark is adjusted.

Production Methods for Producing Products which Qualify for Labelling with the Product Mark
Production Methods for Products Qualifying for a Good Environmental Mark The present invention is directed to production methods for products qualifying for a good environmental mark. The methods reduce the environmental problem associated with the product and will thus allow a better environmental mark. In a preferred embodiment the mark is a Cloud mark, a Sun-cloud mark or a Sun mark and the emission reduced are greenhouse gas emissions such as carbon dioxide emissions.

Use of Evaluation Methods According to the Present Invention

A key method to improve the rating of the mark is to evaluate the problems in the whole production process of a product as described in the preferred methods for evaluating for specific level or value of the specific mark.

Reduction of Emissions in Production of Specific Products to be Marked According to the Invention Preferred method of reducing the emissions is based on the evaluation according to the invention. The emissions are preferably reduced first at stages where this can be done most cost effectively. Preferred methods include selecting raw material which involve less fossil fuel emissions, changing fossil fuel raw material to a non-fossil fuel material, reducing emissions for transportation of raw material or middle product in the production, reducing emissions of the production and reducing emissions of transport to market.

A Compensation Method for Improving the Rating of a Product for Environment Mark Methods have been developed for trading with emissions, especially emissions to the atmosphere. Most developed systems deal with green house gas emissions especially carbon dioxide. The trading of emissions allows compensation of emission affecting the rating of a specific product.

A preferred method of compensating the emissions is based on the evaluation according to the invention. The emissions are preferably compensated first at stages where this can be done most cost effectively. Preferred methods include compensating emissions on the raw material level, on transportation levels or on the production level.

Preferred Carbon Dioxide Compensated Products
Carbon Dioxide Compensated Fossil Fuels In a specific embodiment the present invention is directed to improving the rating of products, which produce carbon dioxide. The present invention is especially directed to fossil fuel products compensated for the carbon dioxide, which will be produced when the fuel is used. In a preferred embodiment the fossil fuel is gasoline or diesel fuel used by automobiles. Traffic is one of the major causes of green house gas emissions but cost of compensation compared with the cost of the fuels for consumers are not so high. Using a European gasoline prize the cost effect of compensation is only a few per cent of the gasoline prices for consumers even for total compensation of carbon dioxide emissions.

This compensation is only a minor fraction of taxes on European gasoline, most of which are environmentally motivated, but not used for improving environmental conditions. The green house effect is the major motivation for the taxes, if emissions are compensated there should be a reason for tax deduction. The cost for compensation of one 20% level of the Cloud mark is only one fifth of that. In a preferred embodiment the present invention is directed to Compensated fuel meaning total green house gas compensated or carbon dioxide compensated gasoline. The present invention is further directed to selling Compensated gasoline as a method to reduce green house gas emissions. In a preferred embodiment the present invention is directed to selling Compensated gasoline marked with a product mark indicating the compensation of carbon dioxide or in other embodiment the total green house gas emissions. In more preferred embodiment the Compensated fuel is sold using a product mark indicating partial or total compensation of green house gas emissions, in another embodiment the mark contains a possibility to indicate regular emissions of the fuel, compensated emissions or total compensation of emissions. In a more preferred embodiment the fossil fuel, more preferably gasoline is sold using a demonstrative and quantitative mark according to the present invention. Most preferably the fossil fuel is sold using a preferred environment mark according to the present invention.

Preferred Process and Methods for Evaluating Qualification in Mark Level or Value The invention is further directed to the preferred process and methods for evaluating the qualification of products for the labelling with the product mark according to the invention.

Organization Structure for Evaluating
Independent Scientific Evaluation Organization Preferably the evaluation for a specific product mark is evaluated by independent and scientifically qualified organization. The organization must be independent from commercial and political ambitions, so that the producers and consumers can trust the evaluations are fair.

The scientific quality of the mark is ensured by including board of internationally recognized scientists specialized to the specific problem. The evaluators of environment mark about green house gas emissions should include specialists about green house gas emissions, production technologies, transport and raw materials.

Open Process

In a preferred embodiment the numbers of the evaluations process or part of the number of the evaluation process are available for the general public. This may be needed to be limited to business secret type information of the producers, on the other hand when only values of the problem, in the environmental mark embodiment the numeric values of emissions, are included without process information, not much secrets are revealed. Most preferably at least all the mathematic formulas used in counting of the ratings (values and/levels) in the quantitative environmental marks are available to the general public and industry allowing discussion about the method and potential development of the process.

Non-profit Organization

In a preferred embodiment the organization for the evaluation of a mark is a non-profit organization. The non-profit status may include a possibility to collect reasonable funds for ensuring the continuation of the operations and even advertising the mark. Preferably the evaluation organization reveals it funding and economics to the general public and industries so that the independent nature of the organization can be ensured.

Preferably the non-profit organization should be associated with international authorities in the problem indicated by the mark. In a preferred embodiment the organization evaluating the green house gas mark is associated with UN-efforts to control green house gas emissions.

Method for Obtaining Additional Indirect Benefit by Licensing this Method to Preferred Organization Structure The invention is further directed to a business method to obtain indirect benefit by licensing the methods to the non-profit organization without requiring profit. The indirect profit of the method would come to the inventor by inventing other problem relieving, preferably environmental friendly, technologies which would benefit in the market where consumer uses a mark or marks according to the invention.

Buying or Shopping Method Using PECD for Compensation of Quantitative Product Based GHG Emissions The invention is further directed to the corresponding green house gas-compensation transaction process (GHG-transaction) process and method of buying by PECD including steps:

1) contacting the selling device in PETI system 2) transfer of information about the amount of greenhouse gas equivalents needed to be compensated from PECD to PETI, 3) adding the amount of equivalents to a compensation account in PETI, 4) transfer of verification data of the compensation by PETI to PECD, 5) at PETI adding the information for billing information of PECD customer for sending bill for the equivalents, or sending request for electronic monetary payment by standard electronic payment process 6) at PECD reducing the amount of compensated units from the account for compensation or from Cumulative Balance Account at PECD.

The invention is directed to method for buying and process for buying by PECD involving compensation of quantitative product based greenhouse gas emission by PETI system comprising steps of 1) contacting the selling device in PETI system by the PECD system
2) transfer of information about the amount of greenhouse gas equivalents needed to be compensated from PECD to PETI,
3) in process of 5a) adding the amount of equivalents needed to be compensated to a compensation account in PETI,
4) optional in process involving transfer of verification data of the compensation by PETI to PECD in process of 5a) and reducing the amount of compensated units from the account for compensation or from Cumulative Balance Account at PECD,
5) at PETI
   5a) adding the information for billing information of PECD customer for sending bill for the equivalents, or
   5b) sending request for electronic monetary payment by standard electronic payment process
   6b) optional electronic payment in process according to 5b and verification of the payment
       at PETI preferably information obtained from bank, adding the amount of equivalents needed to be compensated to a compensation account in PETI and optional sending verification of compensation to
   7b) at PECD reducing the amount of compensated units from the account for compensation or from Cumulative Balance Account at PECD.

The invention is directed to two processes based on account and possible credit for customer in process or method comprising 5a) or alternative process or method of 5b-7b) involving electronic payment.

Contacting PETI Device

The PETI system comprises interface or selling device, which is contacted by the PECD system. The PETI system recognizes and identifies PECD system by standard security means including unique identifier and/or pass word provided by PETI system. It is realized that the identification may in specific embodiment include manual identification by providing password by the user of the PECD. In a separate embodiment the invention is directed to the use of personal unique identifiers of PECD devices such as personal computers or personal computer interfaces or mobile station identifiers such as mobile phone identifiers for identification in the transaction. Specific standards used for mobile monetary transaction such as in WAP-systems can be used.

EXAMPLES

Example 1

Examples feasibility of reducing emissions related to use of a product, when the use yield green house gas emissions. Cost of compensating all emissions of gasoline use.

At current price of carbon dioxide ton is about 10 Euros, prices according to reports. The price of gasoline in Finland is about 1.1 Euro, which is the regular price in Europe. In USA a gallon of gasoline costs about 1 Euro.

Calculation of production carbon dioxide from one kg of gasoline estimated as octane:

$$C_8H_{18} + 12,5\ O_2 \rightarrow 8\ CO_2 + 9\ H_2O$$

One mole octane yield eight mole of carbon dioxide, so considering the molar weights about 114 grams of octane yields 352 g of carbon dioxide.

The density of gasoline is about 0.71 g/ml, thus 114 g of gasoline has volume of 160.1 ml, thus 1.0 liters of gasoline would yield 2200 grams of carbon dioxide. With the price of 0.010 Euro per kg the price of compensating the emission would be 2.2 cents which is 2% of the price of the product. Cost of reducing the use based emissions by 40% would cost about 0.9 cents, by 60% about 1.3 cents and by 80% would cost about 1.8 cents, and complete reduction 2.2 cents. The products indicated by specific use based Climate marks would not cost substantially more than the regular product but show substantial benefit of the product in reducing the problem of the green house effect. The producers may choose to improve their product directly to a certain level and offer better options for consumers.

In USA the price per gasoline is about one fifth or fourth of European prices and the costs of reduction would be 4-5 times higher but still the complete level of compensating the emission would cost only about 10% of the price of the product and marks indicating partial reduction would be useful showing clear benefit with quite reasonable prices.

More than half of the European price consists of various taxes, part of which are environmentally based but are not directed to reducing the major environmental problem.

Example 2

Electronic Transaction, Use of a PECD Device

A PECD is included in an electronic payment system comprising a specific account for greenhouse gas equivalents, analogous to an account for money equivalents is used for a transaction in connection with a purchase of a product. A GHG-transaction process includes 1) contacting the selling device in PETI system 2) transfer of information about the amount of greenhouse gas equivalents needed to be compensated from PECD to PETI, 3) adding the amount of equivalents to a compensation account in PETI, 4) transfer of verification data of the compensation by PETI to PECD, 5) at PETI adding the information for billing information of PECD customer for sending bill for the equivalents, or sending request for electronic monetary payment by standard electronic payment process 6) at PECD reducing the amount of compensated units from the account for compensation or from Cumulative Balance Account at PECD. The process at PETI further involves buying a corresponding amount of emission rights or like from compensation producers (APLCP and/SCP), and involves possible electronic monetary payment by PECD or other form of payment by a customer. The process may include an optional pre-step of inquiring the price of compensated amount by PECD and answer by PETI. A preferred payment system is a cell phone operated WAP-system.

Example 3

Example of a Emission balance calculation by Calculator part of PECD: a consumer buys two products, with Daily Allowance % (DA %) values of 5% and 9% with use time one day and one product with using time of two weeks and value of 28%, and one product with using time of one month and value of 90%. In case mode of dividing larger the amounts daily basis: the Emission Balance will be 100−5−9−2−3=81% and the Emission balance of following 13 days will be reduced by 5% and on days 14-30 by 3%. Alternatively consumer may choose mode of compensating automatically or manually selected larger or multi day DA % values such as e.g. the 9% and 28% emission by transfer these to CBA (cumulative balance account) or to PETI system. In such case the on line Emission Balance will be 86%. In yet another alternative mode the consumer takes all the DA % values to the account and Emission Balance will be 100−5−9−28−90=−68%. The negative balance may be chosen manually or automatically to be transferred to CBA for possible balancing from next/following days remaining DA % values or transferred to PETI system for compensation.

Example 4

A person collects shoppings from a consumer goods store. In context of payment the operator of cash register machine asks if the customer would like to compensate the greenhouse gas emission of the shoppings (or other indirect property of shoppings). The customer says that he (or she) would like to compensate 75% of the emissions. The cash register operator selects compensation on icon of cash register display and another icon for compensation level. The cash register system calculates the price of compensation based on information of product-based emissions from PED database and price of the emission based on a pricing of a compensation program used. The price of compensation is added to price of shoppings and the customer pays the price.

Example 5

Person collects shoppings from a consumer goods store. In context of payment the cash register machine/system recognizes the customer based identification from customer card, credit card or like or by information send by a PECD system, and compares the identification to database of customer who would like to compensate the greenhouse gas emission of the shoppings (or other indirect property of shoppings). The customer is recognized as wishing specific level of compensation. The cash register system calculates the price of compensation based on information of product-based emissions from PED database and price of the emission based on a pricing of a compensation program/service used. The price of compensation is added to price of shoppings and the customer pays the price. The compensation is performed by cash register system by contacting PETI.

Alternatively the cash register does not add the compensation to the price but provides the information of specific compensation need to PECD, which preferably performs compensation with PETI system and/or collects data for personal emission control.

The invention claimed is:

1. A method of charging an individual consumer for greenhouse gas emissions related to the purchase of a product, comprising:
   providing a database of products including greenhouse gas emission data for the products, wherein the emission data includes one or more of raw materials, transportation, production, and sale for each of the plurality of products;
   calculating a greenhouse gas daily emissions allowance for a consumer based on a calculated estimate of daily emissions of a global population multiplied by a target emission reduction percentage set by a third-party organization;
   receiving a purchase request from the consumer for a product;
   if emission data for the product exists in the database then calculating an emission value of the product based, at least in part, on emission data of the product in the database;
   if emission data for the product does not exist in the database then calculating an emission value of an associated product based, at least in part, on emission data of the associated product in the database;
   calculating an emission balance for the consumer based on the daily emissions allowance and the emission value;
   charging the consumer for the product and for an amount based on the emission balance; wherein the steps above are performed using a computer processor.

2. The method of claim 1, further comprising the step of providing a personal emission control device.

3. The method of claim 1, further comprising a personal emission trade interface which buys units of greenhouse gas emissions from other organizations to sell to consumers through a personal emission control device.

4. The method of claim 1, further comprising compensating the emission balance by personal carbon accumulation measures.

5. The method of claim 3, further comprising documenting the units of greenhouse gas emissions using cameras connected to the Internet.

6. The method of claim 2, wherein the personal emission control device is selected from a group comprising: a mobile station, a mobile phone, mobile shopping device, MP3 player, game device, radio, mobile TV, camera, computer, handheld computer, watch, music player, video game, electric notebook or diary, health device measuring a health parameter such as heart rate and/or steps taken, calculator, or currency calculator or combination thereof.

7. The method the claim 1, further comprising using a cash register machine for providing payment.

8. The method the claim 1, further comprising using a customer identification system having personal identification.

9. The method the claim 1, wherein the method of receiving the purchase request includes the use of a bar code scanner or RFID reader or other scanning or reading device.

10. A system configured to charge an individual consumer for greenhouse gas emissions related to the purchase of a product, comprising:
a computer processor;
a memory configured with instructions to perform the following steps when executed by the computer processor:
providing a database of products including greenhouse gas emission data for the products, wherein the emission data includes one or more of raw materials, transportation, production, and sale for each of the plurality of products;
calculating a greenhouse gas daily emissions allowance for a consumer based on a calculated estimate of daily emissions of a global population multiplied by a target emission reduction percentage set by a third-party organization;
receiving a purchase request from the consumer for a product;
if emission data for the product exists in the database then calculating an emission value of the product based, at least in part, on emission data of the product in the database;
if emission data for the product does not exist in the database then calculating an emission value of an associated product based, at least in part, on emission data of the associated product in the database;
calculating an emission balance for the consumer based on the daily emissions allowance and the emission value;
charging the consumer for the product and for an amount based on the emission balance.

11. The system of claim 10, further comprising a personal emission control device.

12. The system of claim 10, further comprising a personal emission trade interface configured to buy units of greenhouse gas emissions from other organizations to sell to consumers through a personal emission control device.

13. The system of claim 10, wherein the memory is further configured to cause the processor to compensate the emission balance by personal carbon accumulation measures.

14. The system of claim 12, wherein the memory is further configured to cause the processor to document the units of greenhouse gas emissions using cameras connected to the internet.

15. The system of claim 11, wherein the personal emission control device is selected from a group comprising: a mobile station, a mobile phone, mobile shopping device, MP3 player, game device, radio, mobile TV, camera, computer, handheld computer, watch, music player, video game, electric notebook or diary, health device measuring a health parameter such as heart rate and/or steps taken, calculator, or currency calculator or combination thereof.

16. The system of claim 10, further comprising a cash register machine for providing payment.

17. The system of claim 10, wherein the memory is further configured to cause the processor to use a customer identification system having personal identification.

18. The system of claim 10, wherein the memory is further configured to cause the processor to use a bar code scanner or RFID reader or other scanning or reading device.

19. A non-transitory computer readable medium comprising instructions which when executed by a computer processor cause the computer processor to perform the following steps:
providing a database of products including greenhouse gas emission data for the products, wherein the emission data includes one or more of raw materials, transportation, production, and sale for each of the plurality of products;
calculating a greenhouse gas daily emissions allowance for a consumer based on a calculated estimate of daily emissions of a global population multiplied by a target emission reduction percentage set by a third-party organization;
receiving a purchase request from the consumer for a product;
if emission data for the product exists in the database then calculating an emission value of the product based, at least in part, on emission data of the product in the database;
if emission data for the product does not exist in the database then calculating an emission value of an associated product based, at least in part, on emission data of the associated product in the database;
calculating an emission balance for the consumer based on the daily emissions allowance and the emission value;
charging the consumer for the product and for an amount based on the emission balance;
wherein the steps above are performed using a computer processor.

20. The medium of claim 19, further comprising the step of communicating with a personal emission control device.

21. The medium of claim 19, further comprising communicating with a personal emission trade interface which buys units of greenhouse gas emissions from other organizations to sell to consumers through a personal emission control device.

22. The medium of claim 19, further comprising compensating the emission balance by personal carbon accumulation measures.

23. The medium of claim 21, further comprising documenting the units of greenhouse gas emissions using cameras connected to the Internet.

24. The medium of claim 20, wherein the personal emission control device is selected from a group comprising: a mobile station, a mobile phone, mobile shopping device, MP3 player, game device, radio, mobile TV, camera, computer, handheld computer, watch, music player, video game, electric notebook or diary, health device measuring a health parameter such as heart rate and/or steps taken, calculator, or currency calculator or combination thereof.

25. The medium the claim 19, further comprising communicating with a cash register machine used for providing payment.

26. The medium the claim 19, further comprising using a customer identification system having personal information.

27. The medium the claim 19, wherein the method of receiving the purchase request includes the use of a bar code scanner or RFID reader or other scanning or reading device.

28. The method of claim 1 further comprising displaying greenhouse emission data in a form of a quantitative product mark.

* * * * *

UNITED STATES PATENT AND TRADEMARK OFFICE
CERTIFICATE OF CORRECTION

PATENT NO.         : 8,010,413 B2
APPLICATION NO.    : 12/294125
DATED              : August 30, 2011
INVENTOR(S)        : Jari Natunen Page 1 of 1

It is certified that error appears in the above-identified patent and that said Letters Patent is hereby corrected as shown below:

Column 38, Line 55, Claim 25:

After "The medium" delete "the claim" and insert -- of claim --.

Column 38, Line 58, Claim 26:

After "The medium" delete "the claim" and insert -- of claim --.

Column 38, Line 60, Claim 27:

After "The medium" delete "the claim" and insert -- of claim --.

Signed and Sealed this
Eighth Day of November, 2011

David J. Kappos
*Director of the United States Patent and Trademark Office*